United States Patent
Tang et al.

(10) Patent No.: US 11,457,163 B1
(45) Date of Patent: Sep. 27, 2022

(54) IMAGE SENSOR DEVICE CAPABLE OF IMPROVING SIGNAL DISCRIMINATION IN DARK CONDITION AND AVOIDING SIGNAL SATURATION IN BRIGHT CONDITION

(71) Applicant: PixArt Imaging Inc., Hsin-Chu (TW)

(72) Inventors: Kuan Tang, Hsin-Chu (TW); Jui-Te Chiu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/377,413

(22) Filed: Jul. 16, 2021

(51) Int. Cl.
*H04N 5/355* (2011.01)
*H04N 5/378* (2011.01)
*H04N 5/369* (2011.01)
*H04N 5/353* (2011.01)

(52) U.S. Cl.
CPC ......... *H04N 5/3559* (2013.01); *H04N 5/3532* (2013.01); *H04N 5/3698* (2013.01); *H04N 5/378* (2013.01)

(58) Field of Classification Search
CPC .. H04N 5/3559; H04N 5/3532; H04N 5/3698; H04N 5/378
See application file for complete search history.

(56) References Cited

U.S. PATENT DOCUMENTS

| | | | | |
|---|---|---|---|---|
| 8,427,564 | B2* | 4/2013 | Yamashita | H04N 5/343 348/294 |
| 8,969,775 | B2* | 3/2015 | Chen | H04N 5/2355 348/308 |
| 9,276,031 | B2* | 3/2016 | Wan | H01L 27/1464 |
| 9,933,300 | B2* | 4/2018 | Do | H04N 5/37457 |
| 10,397,503 | B2* | 8/2019 | Malinge | H04N 5/35554 |
| 11,343,450 | B1* | 5/2022 | Hasegawa | H04N 5/351 |
| 2016/0155768 | A1* | 6/2016 | Yi | H01L 27/14636 257/225 |
| 2019/0260949 | A1* | 8/2019 | Geurts | H04N 5/3577 |
| 2021/0235026 | A1* | 7/2021 | Xu | H04N 5/357 |

FOREIGN PATENT DOCUMENTS

CN 109194890 B * 12/2020 ............ H04N 5/351

* cited by examiner

Primary Examiner — Nhan T Tran
(74) Attorney, Agent, or Firm — Winston Hsu

(57) ABSTRACT

An image sensor device is provided to effectively improve the signal discrimination of sensed/sampled pixel values/signals in the image sensor device operating in a dark condition as well as effectively avoiding signal saturation when such image sensor device operates in a light/bright condition. Such image sensor device, when operating in dark/light conditions, can perform the exposure operation to get/sample accurate pixel image signal and pixel reset signal for only one time without estimating the pixel image signal and pixel reset signal by performing the exposure operation twice.

20 Claims, 23 Drawing Sheets

Prior art

Bright condition the invention

IMAGE SENSOR DEVICE CAPABLE OF IMPROVING SIGNAL DISCRIMINATION IN DARK CONDITION AND AVOIDING SIGNAL SATURATION IN BRIGHT CONDITION

BACKGROUND OF THE INVENTION

1. Field of the Invention

The invention relates to an image sensing mechanism, and more particularly to an image sensor device.

2. Description of the Prior Art

Generally speaking, the performance of a conventional image sensor device may be easily affected by the worse signal discrimination when it is in a dark condition and may be also affected by the signal saturation when it is in a bright condition. It is difficult for the conventional image sensor device to provide a high dynamic signal range suitable for the bright condition and dark condition. In addition, the conventional image sensor device cannot achieve the requirements of true CDS (correlated double sampling) operation since it is limited by its circuit design.

SUMMARY OF THE INVENTION

Therefore one of the objectives of the invention is to provide an image sensor device, to solve the above-mentioned problems.

According to embodiments of the invention, an image sensor device is disclosed. The device comprises a plurality of pixel units. Each pixel unit comprises a photodiode, a transfer gate transistor, a first source follower transistor, a reset transistor, a reset control transistor, and a second source follower transistor. The photodiode is coupled to a ground level. The transfer gate transistor has a first terminal coupled to the photodiode, a second terminal coupled to a first floating diffusion node, and a control terminal coupled to a transfer gate signal. The first source follower transistor has a first terminal coupled to the first supply voltage level, a second terminal coupled to an output node, and a control terminal coupled to the first floating diffusion node. The reset transistor has a first terminal coupled to a second supply voltage level, a second terminal coupled to a second floating diffusion node, and a control terminal coupled to a reset signal. The reset control transistor has a first terminal coupled to the second floating diffusion node, a second terminal coupled to the first floating diffusion node, and a control terminal coupled to a reset control signal. The second source follower transistor has a first terminal coupled to the first supply voltage level, a second terminal coupled to the output node, and a control terminal coupled to the second floating diffusion node. A potential barrier caused by the reset control transistor, which is controlled by the reset control signal, is lower than a potential barrier caused by the transfer gate transistor when being turned off.

According to the embodiments, the provided image sensor device is capable of providing HDR (high dynamic range) to sample pixel image signals. In addition, the image sensor device employs the true CDS operation to sample the pixel image signal and pixel reset signal during the time period of one-time exposure operation. Thus, the result of CDS operation can be more accurate.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing an image sensor device and corresponding technical solution capable of effectively improving the signal discrimination of sensed/sampled pixel values/signals in the image sensor device operating in a dark condition as well as effectively avoiding signal saturation when such image sensor device operates in a light/bright condition. No matter which bright/dark conditions such image sensor device operates, it can perform the exposure operation for only one time to get/sample accurate pixel image signal and pixel reset signal without estimating the pixel image signal and pixel reset signal by performing the exposure operation twice. That is, the image sensor device employs a true CDS (correlated double sampling) operation. The provided image sensor device can be suitable for and operate under a global shutter mode or a rolling shutter mode.

Figure 1:
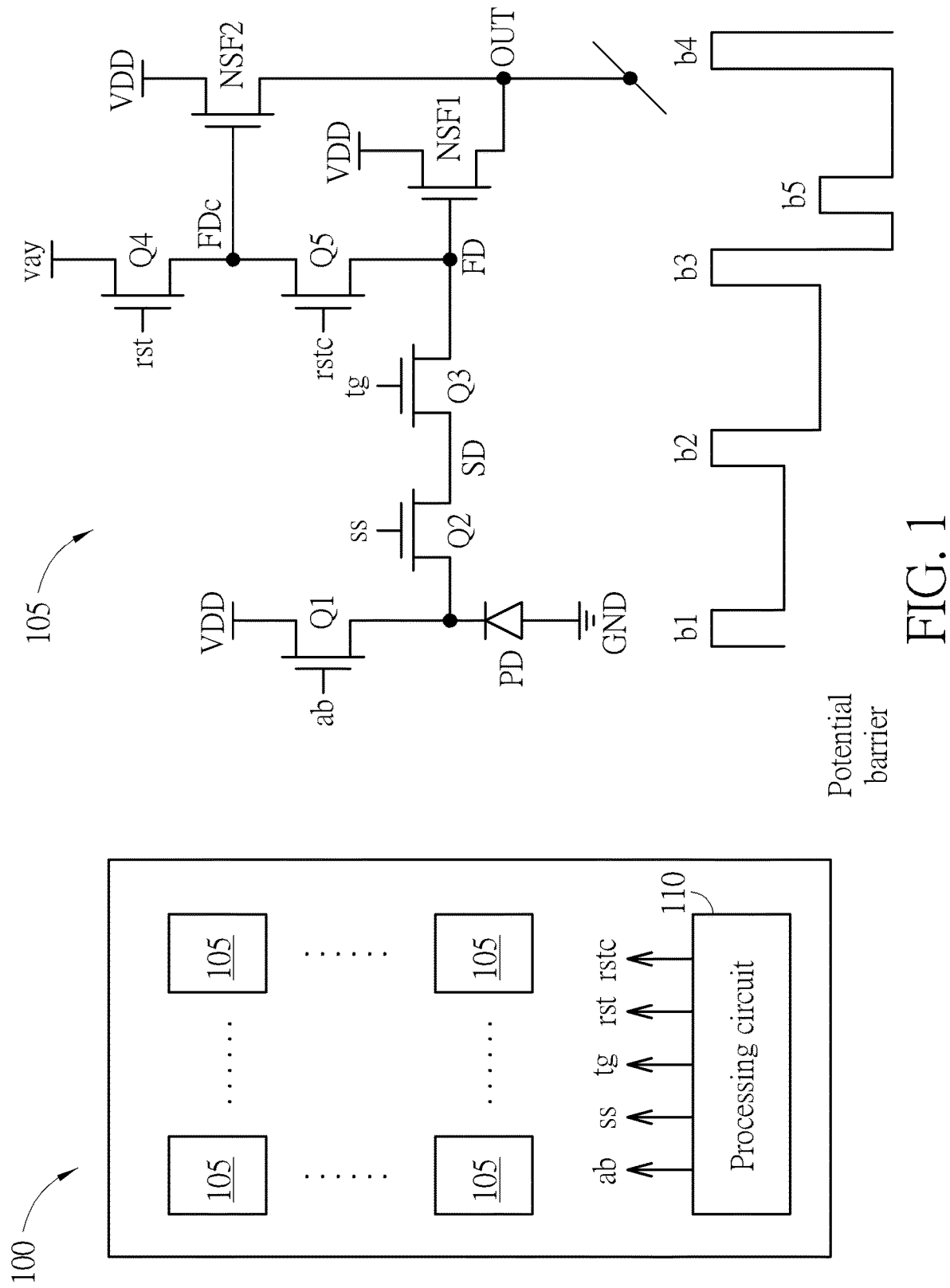
FIG. 1 is a diagram of an image sensor device operating based on a global shutter mode according to an embodiment of the invention.

FIG. 1 is a diagram of an image sensor device 100 operating based on the global shutter mode according to an embodiment of the invention. The image sensor device 100 comprises a plurality of pixel units 105, i.e. sensing pixels or sub-pixels, and a processing circuit 110. Each pixel unit 105 comprises a photodiode PD, an anti-blooming transistor Q1, an intermediate transistor Q2, a transfer gate transistor Q3, a first source follower transistor NSF1, a reset transistor Q4, a reset control transistor Q5, and a second source follower transistor NSF2. The photodiode PD is coupled between a ground level GND and the anti-blooming transistor Q1. The anti-blooming transistor Q1 has a first terminal, a second terminal, and a control terminal. Its first terminal is coupled to a first supply voltage level VDD, and its second terminal is coupled to the photodiode PD. Its control terminal is coupled to an anti-blooming signal ab. The intermediate transistor Q2 has a first terminal, a second terminal, and a control terminal. Its first terminal is coupled to the photodiode PD, and its second terminal is coupled to a storage diffusion node SD. Its control terminal is coupled to an intermediate control signal ss. The transfer gate transistor Q3 has a first terminal, a second terminal, and a control terminal. Its first terminal is coupled to the storage diffusion node SD, and its second terminal is coupled to a first floating diffusion node FD. Its control terminal is coupled to a transfer gate signal tg. The first source follower transistor NSF1 has a first terminal coupled to the first supply voltage level VDD, a second terminal coupled to an output node OUT, and a control terminal coupled to the first floating diffusion node FD. The reset transistor Q4 has a first terminal coupled to a second supply voltage level vay, a second terminal coupled to a second floating diffusion node FDc, and a control terminal coupled to a reset signal rst. The reset control transistor Q5 has a first terminal coupled to the second floating diffusion node FDc, a second terminal coupled to the first floating diffusion node FD, and a control terminal coupled to a reset control signal rstc. The second source follower transistor NSF2 has a first terminal coupled to the first supply voltage level VDD, a second terminal coupled to the output node OUT, and a control terminal coupled to the second floating diffusion node FDc. The second supply voltage level vay is an adjustable supply voltage level which can be equal to or lower than the first supply voltage level VDD that is a high supply voltage level such as 3.3 Volts (not limited). The second supply voltage level vay can be controlled by the processing circuit 110.

The processing circuit 110 is coupled to the plurality of pixel units 105, and it is used for generating the anti-blooming signal ab, the intermediate control signal ss, the transfer gate signal tg, the reset signal rst, and the reset control signal rstc. As shown in FIG. 1, the transistors Q1-Q4 can be fully/completely turned off by the corresponding control signals, and their potential barriers b1-b4 are established to form corresponding potential wells which can be used to capture energy, charges, or particles (charged particles). As shown in FIG. 1, the tops of the potential barriers b1-b4 may be at and associated with the substantial identical level, and the bottoms of the formed potential wells due to the circuit designs are at and associated with different levels. For example, as shown in FIG. 1, the bottom of the potential well formed by the potential barriers b3 and b4 is lower than the bottom of the potential well formed by the potential barriers b2 and b3, and the bottom of the potential well formed by the potential barriers b2 and b3 is lower than the bottom of the potential well formed by the potential barriers b1 and b2. In addition, once any of the transistors Q1-Q4 is fully turned on, the corresponding potential barrier is removed and a corresponding potential well disappears.

Further, in this embodiment, the conductance of the transistor Q5 can be gradually controlled by the control signal rstc generated from the processing circuit 110. The processing circuit 110 can control the transistor Q5 be kept at the state of not fully turned off without completely turning off the transistor Q5, so as to establish the potential barrier b5 which has the top at the level not higher than the level of the top of potential barrier b3 (or the top of potential barrier b4). In FIG. 1, a small, narrow, and shallow potential well can be formed by the potential barriers b3 and b5, compared to the large, broad, and deep potential well formed by the potential barriers b3 and b4. However, this is not meant to be a limitation of the invention.

Further, in another situation, the processing circuit 110 can completely turn on the transistor Q5 to remove the potential barrier b5 if necessary so as to remove the small, narrow, and shallow potential well. It should be noted that, in this embodiment, the processing circuit 110 does not fully turn off the transistor Q5. However, in other embodiments, the processing circuit 110 may substantially and fully turn off the transistor Q5. This is also not intended to be a limitation of the invention.

Figure 2:
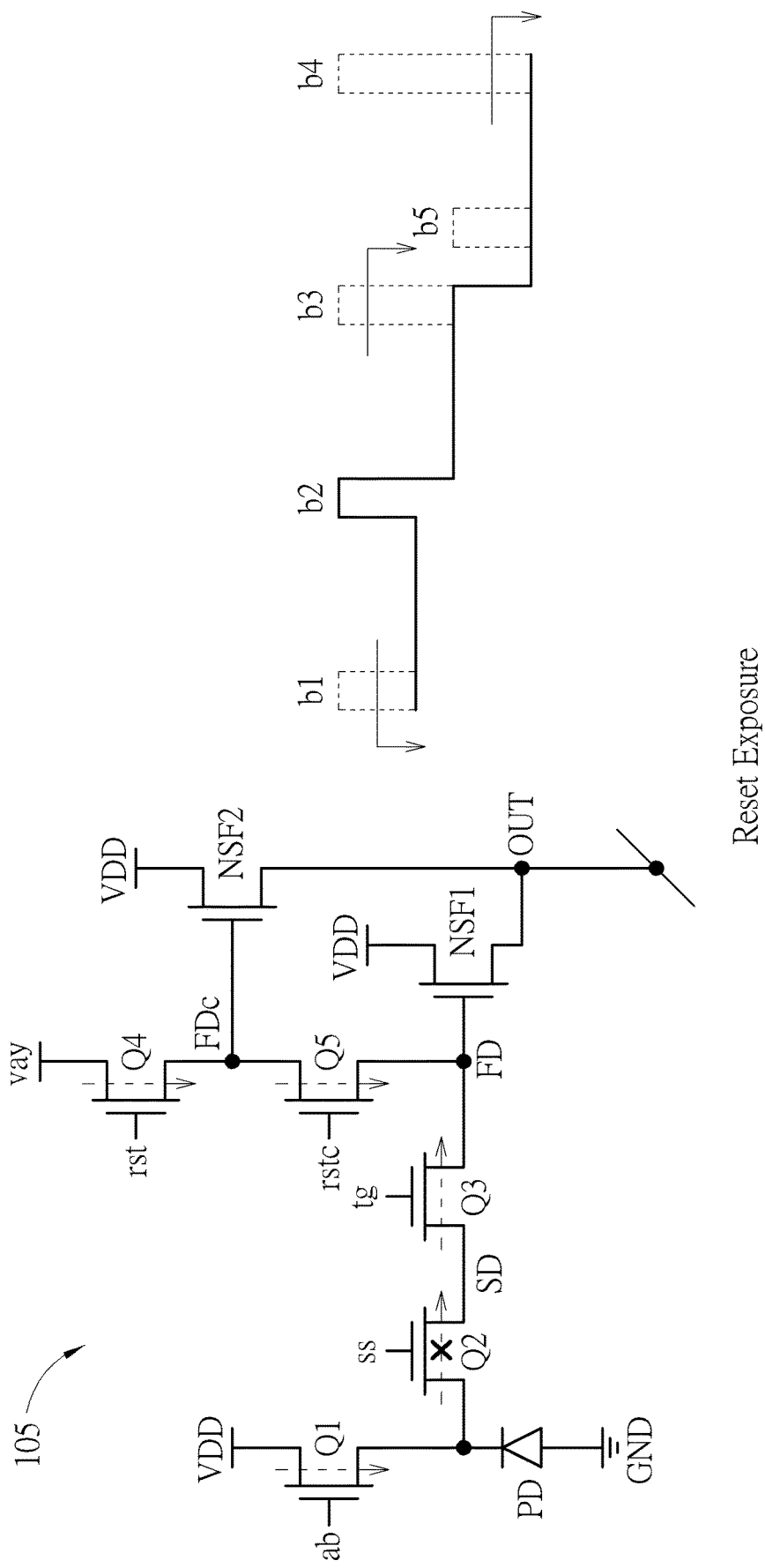
FIG. 2 is a diagram showing the reset exposure operation of the pixel unit as shown in FIG. 1 according to an embodiment of the invention.

The operation of one or each pixel unit 105 is described in the following paragraphs. FIG. 2 is a diagram showing the reset exposure operation of the pixel unit 105 as shown in FIG. 1 according to an embodiment of the invention. As shown in FIG. 2, the transistors Q1, Q3, Q4, and Q5 are fully turned on by corresponding control signals ab, tg, rstc, and rst, respectively, and the transistor Q2 is fully turned off by the control signal ss. The top of potential barrier b2 is kept at the same level/height, and the other potential barriers b1, b3, b4, and b5 disappear. Since the potential barrier b1 disappears, the particles (charges, energy, or electrons) at the node between the transistor Q1 and photodiode PD escape or disappear (as indicated by the arrow in FIG. 1). Similarly, the particles respectively at the storage diffusion node SD, first floating diffusion node FD, and second floating diffusion node FDc also escape or disappear since in this situation no potential barriers stop the particles; the potential barriers b3, b4, and b5 in FIG. 2 are removed. This achieves resetting the residual exposure amounts and residual charges at the circuit nodes SD, FD, and FDc. After the reset exposure operation is finished, the pixel unit 105 performs the exposure operation.

Figure 3:
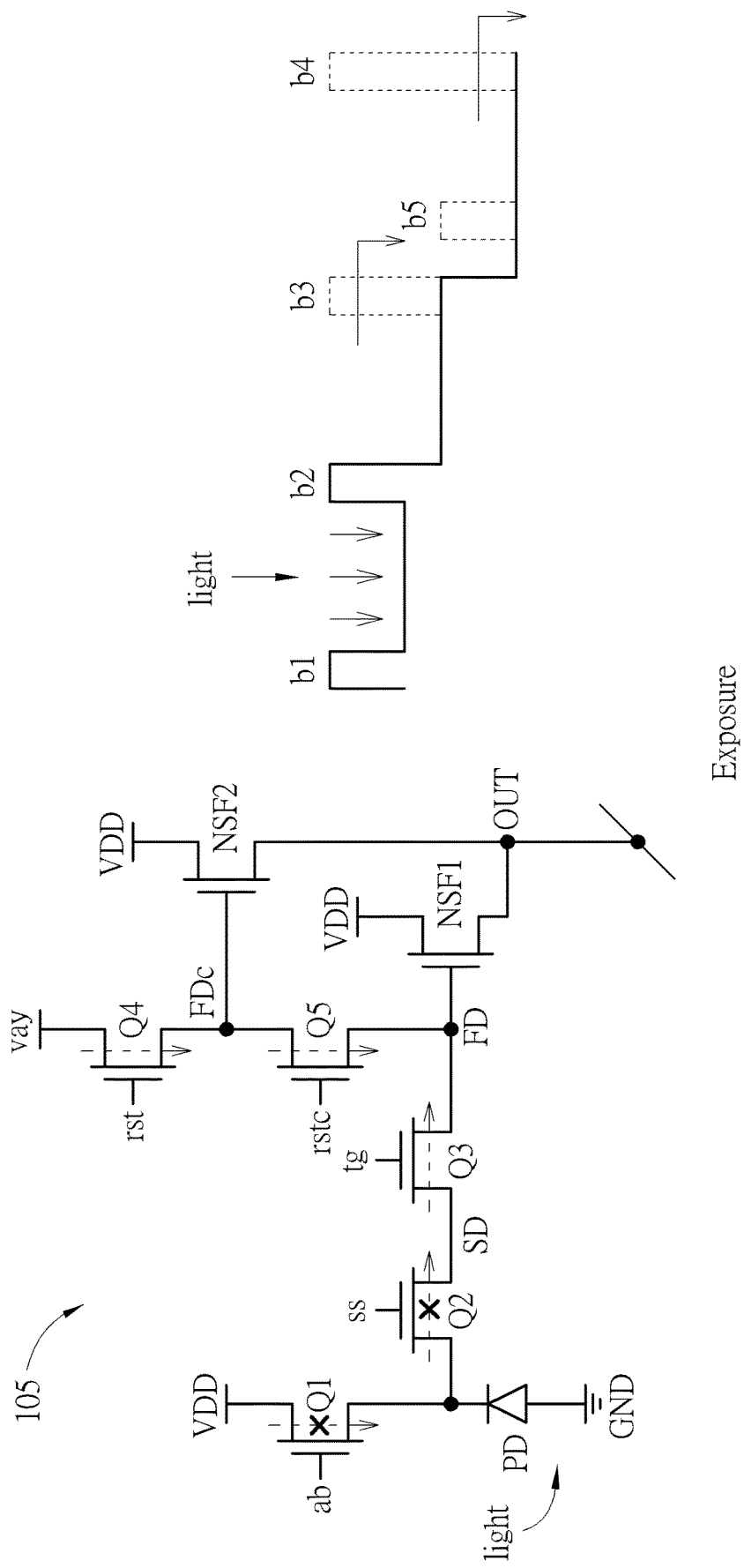
FIG. 3 is a diagram showing the exposure operation of the pixel unit as shown in FIG. 1 according to an embodiment of the invention.

FIG. 3 is a diagram showing the exposure operation of the pixel unit 105 as shown in FIG. 1 according to an embodiment of the invention. As shown in FIG. 3, the levels of supply voltages vay and VDD are controlled at a higher level such as 3.3 Volts (but not limited). The transistor Q1 is fully turned off by the control signal ab, and the potential barrier b1 is established again to form the potential well between the potential barriers b1 and b2. During a time period of the exposure operation, the photodiode PD converts the incident light into an electrical current, and the particles (charges, energy, or electrons) converted from the incident light can be captured and accumulated by such potential well as shown in FIG. 3. In FIG. 3, the particles (charges, energy, or electrons) are accumulated at the node between the transistors Q1 and Q2, i.e. between the potential barriers b1 and b2. The amount of particles (charges, energy, or electrons) converted from the incident light is proportional to the light condition. That is, a large accumulated amount of particles corresponds to a bright/light condition, and a small accumulated amount of particles corresponds to a dark condition. After the exposure operation is finished, the pixel unit 105 performs the global dump operation.

Figure 4:
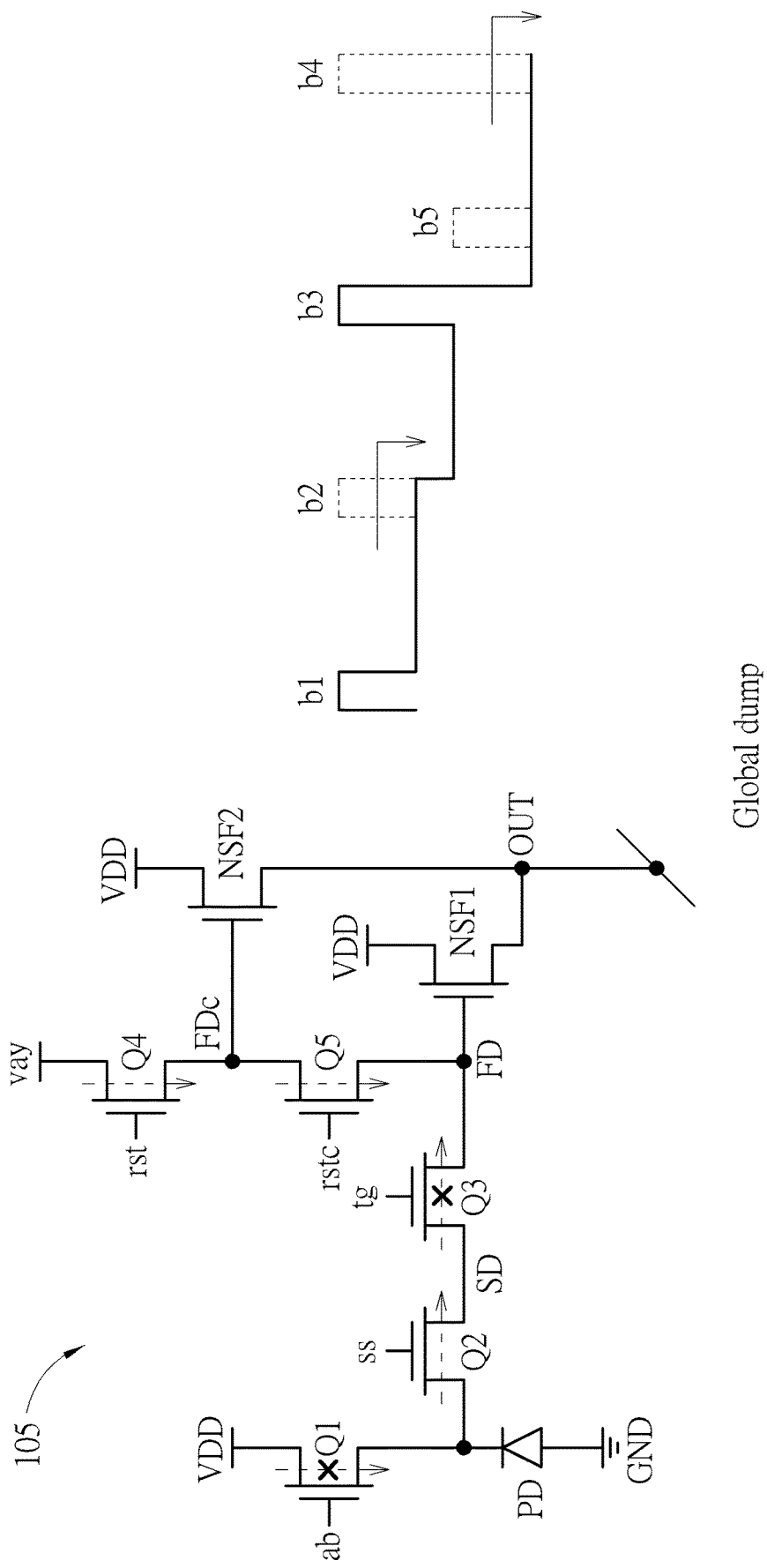
FIG. 4 is a diagram showing the dump (or global dump) operation of the pixel unit as shown in FIG. 1 according to an embodiment of the invention.

FIG. 4 is a diagram showing the dump (or global dump) operation of the pixel unit 105 as shown in FIG. 1 according to an embodiment of the invention. As shown in FIG. 4, the levels of supply voltages vay and VDD are controlled at the higher level such as 3.3 Volts (but not limited). The transistor Q2 is now fully turned on by the control signal ss and becomes conductive, and thus the potential barrier b2 is removed. In addition, the transistor Q3 is fully turned off by the control signal tg and becomes non-conductive, and the particles captured by the potential well as shown in FIG. 3 move or are dumped into a lower potential level from a higher potential level and then are stopped by the potential barrier b3. That is, a sensed/sampled pixel image signal corresponding to the captured particles is transmitted or dumped from the node at one terminal of the photodiode PD into the storage diffusion node SD, and the sensed/sampled pixel image signal is not transmitted to the first floating diffusion node FD since the transistor Q3 is turned-off and non-conductive. After the global dump operation is finished, the pixel unit 105 performs the wait for readout operation.

Figure 5:
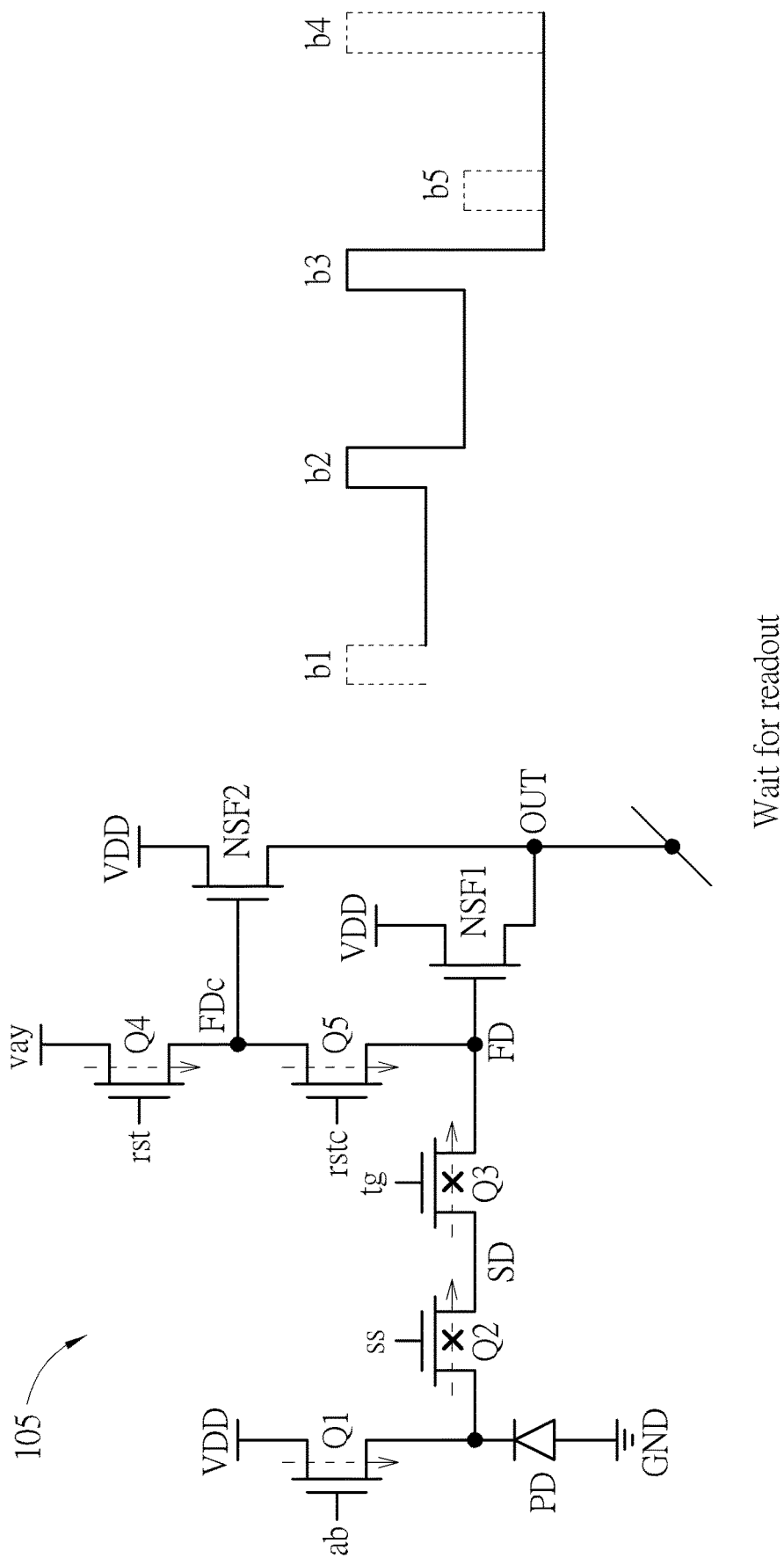
FIG. 5 is a diagram showing the wait for readout operation of the pixel unit as shown in FIG. 1 according to an embodiment of the invention.

FIG. 5 is a diagram showing the wait for readout operation of the pixel unit 105 as shown in FIG. 1 according to an embodiment of the invention. As shown in FIG. 5, the level of supply voltage VDD is controlled at the higher level such as 3.3 Volts, and the level of supply voltage vay is controlled at a lower level such as a level ranging between 0.5 Volts and 0.7 Volts (but not limited). The transistor Q1 is fully turned on by the control signal ab and becomes conductive, and thus the potential barrier b1 is removed. In addition, the transistor Q2 is fully turned off by the control signal ss, and the potential barrier b2 is established again. In addition, in this situation, the supply voltage vay is controlled by the image sensor device 100 (or processing circuit 110) to provide a lower voltage level (i.e. the level ranging between 0.5 Volts and 0.7 Volts) if no row select transistors are employed by the image sensor device 100. Such lower voltage level vay can be used to appropriately turn off the transistors NSF1 and NSF2 without affecting the pixel value readout at other rows. In one embodiment, if a row select transistor is employed and included by the pixel unit 105, the supply voltage vay can be controlled as a higher supply voltage level such as 3.3 Volts. However, this is not meant to be a limitation. In this embodiment, after the wait for readout operation is finished, the pixel unit 105 performs the reset FD operation. However, it should be noted that in other embodiments the wait for readout operation may be optional. That is, in some embodiments, after the global dump operation in FIG. 4 is finished, the pixel unit 105 may directly perform the reset FD operation in FIG. 6 without performing the wait for readout operation.

Figure 6:
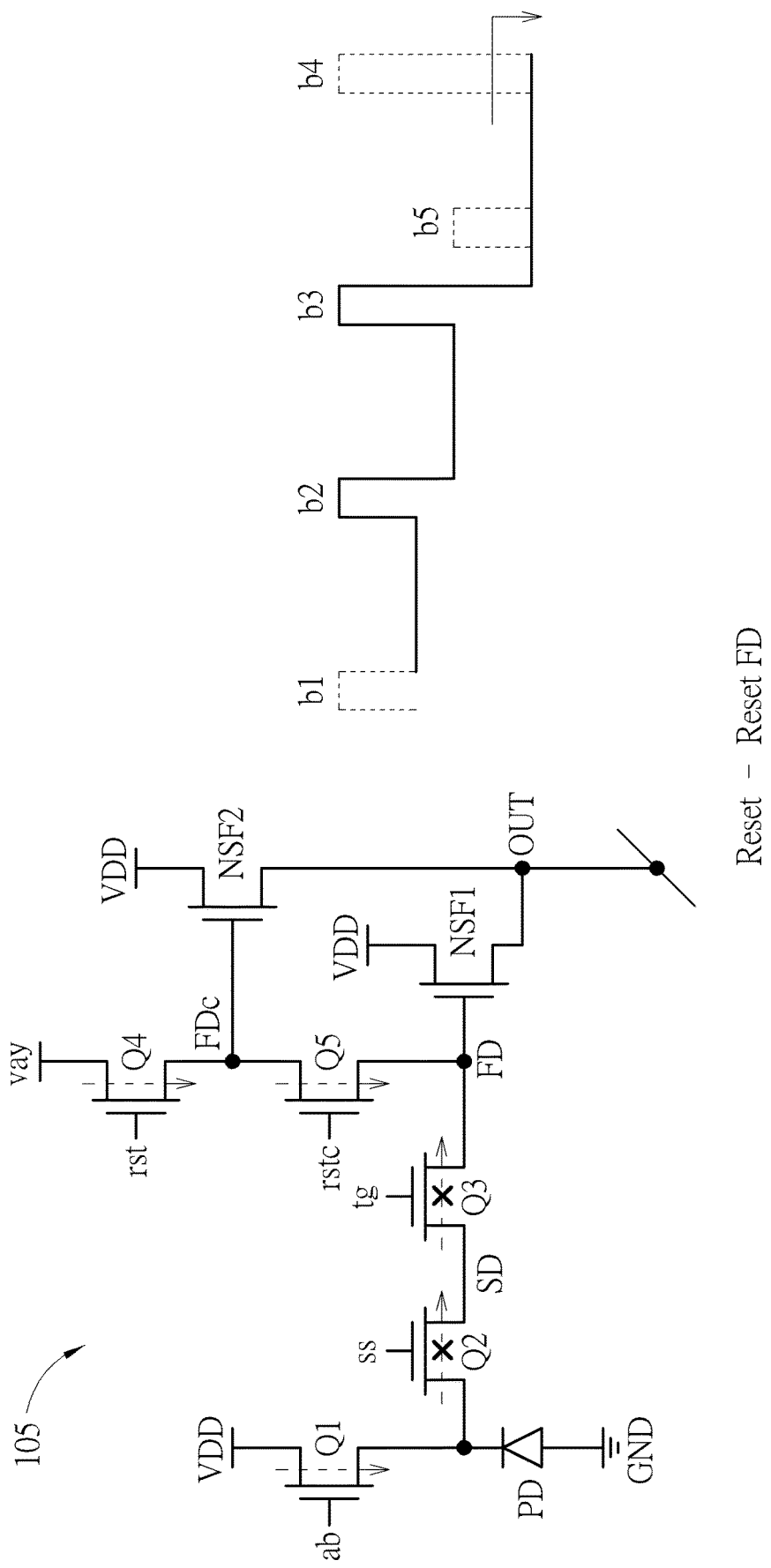
FIG. 6 is a diagram showing the reset FD operation of the pixel unit as shown in FIG. 1 according to an embodiment of the invention.

FIG. 6 is a diagram showing the reset FD operation of the pixel unit 105 as shown in FIG. 1 according to an embodiment of the invention. As shown in FIG. 6, the levels of supply voltages VDD and vay are controlled at the higher level such as 3.3 Volts (but not limited). The transistors Q2 and Q3 are kept at the turned-off state, and the transistors Q4 and Q5 are kept at the turned-on state. The second supply voltage level vay is raised up to the high voltage level (e.g. 3.3 Volts) to turn on the first source follower transistor NSF1 and the second source follower transistor NSF2. The residual energy or charges at the first floating diffusion node FD can be cleared and reset since the potential barriers b4 and b5 are not established to form a potential well. After the reset FD operation is finished, the pixel unit 105 performs the reset FDc operation.

Figure 7:
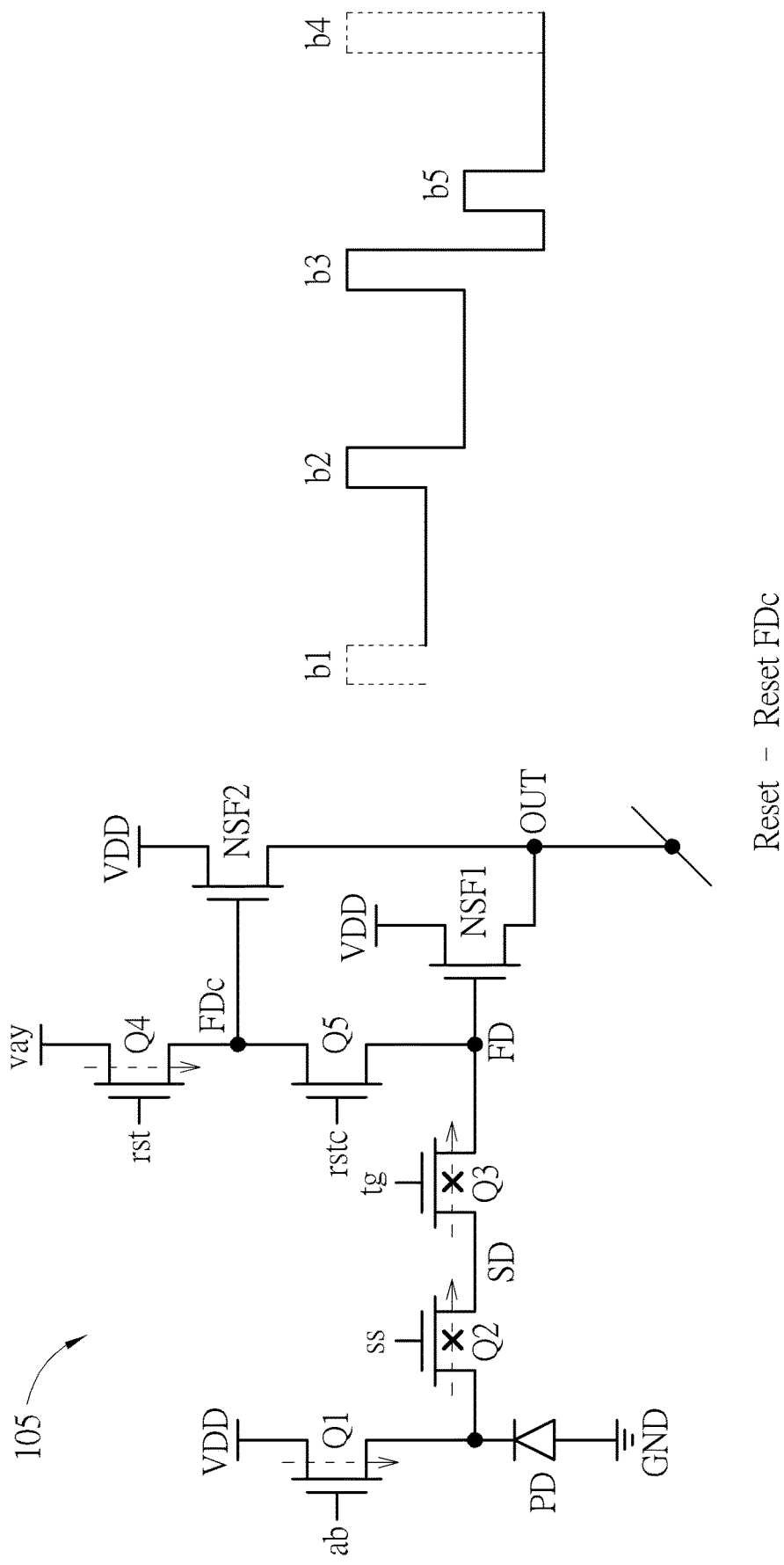
FIG. 7 is a diagram showing the reset FDc operation of the pixel unit as shown in FIG. 1 according to an embodiment of the invention.

FIG. 7 is a diagram showing the reset FDc operation of the pixel unit 105 as shown in FIG. 1 according to an embodiment of the invention. As shown in FIG. 7, the level of supply voltage VDD is controlled at the higher level such as 3.3 Volts (but not limited). The processing circuit 110 at first generates and uses the control signal rstc with a lower voltage (i.e. decreasing the voltage of control signal rstc) and then controls the level of supply voltage vay be within a range lower than the level of VDD, e.g. a range between 0.7 Volts and 3.3 Volts, so as to control transistor Q5 be not fully turned off. That is, the second supply voltage level vay is decreased down to an intermediate voltage level between the high voltage level 3.3 Volts and the low voltage level 0.7 Volts. The transistor Q5 is controlled and kept at a smaller (or very small) conductance ratio state (partially conductive) so as to establish the potential barrier b5 which has the top corresponding to a lower potential level significantly lower than that corresponding to the top of potential barrier b3. Accordingly, a small, narrow, and shallow potential well can be formed by the potential barriers b3 and b5. In this situation, the transistor Q4 is fully turned on by the control signal rst, and thus the potential barrier b4 is not established. The residual energy or charges at the second floating diffusion node FDc can be cleared and reset. After the reset FDc operation is finished, the pixel unit 105 performs the read reset value operation.

Figure 8:
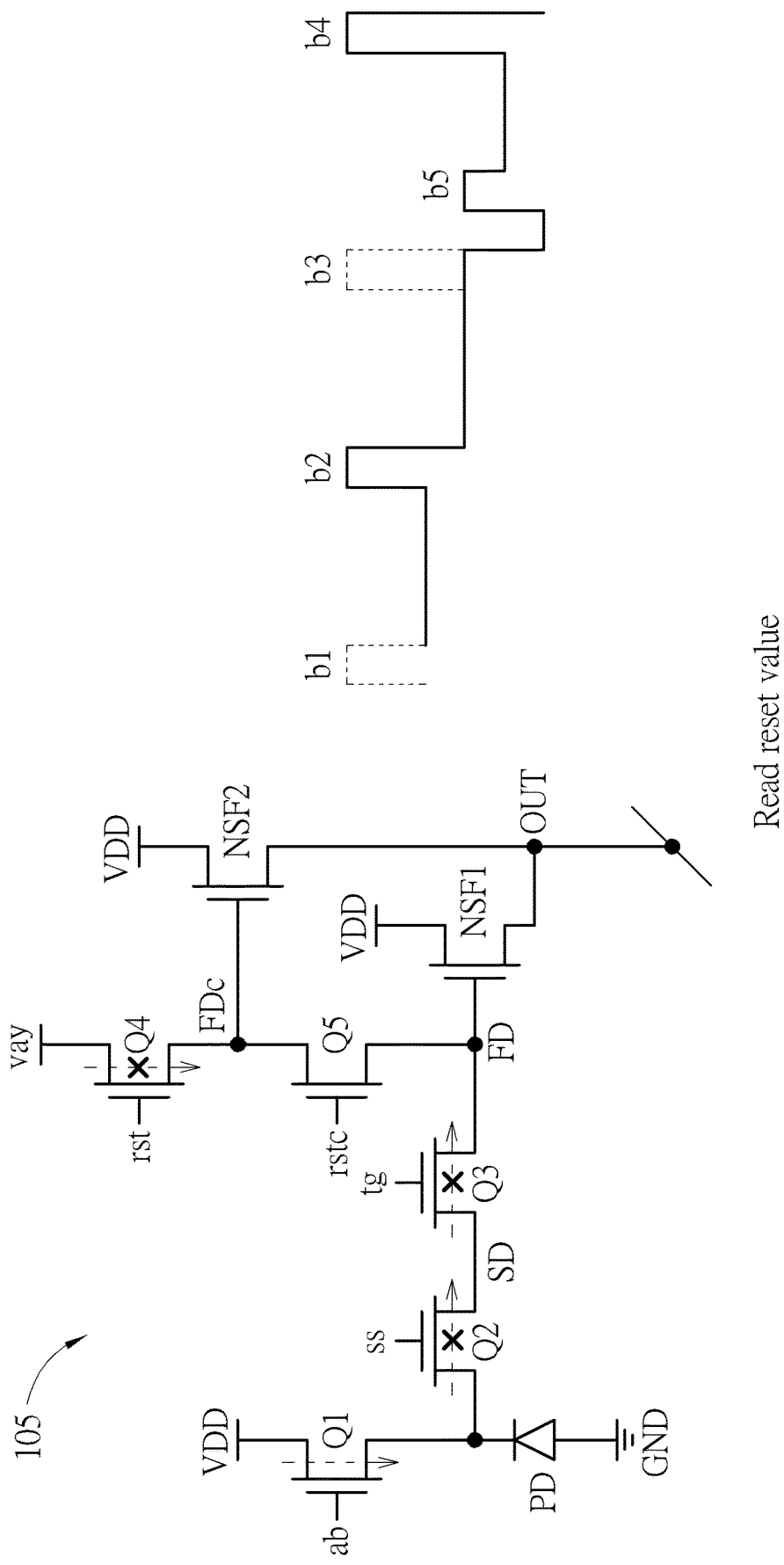
FIG. 8 is a diagram showing the read reset value operation of the pixel unit as shown in FIG. 1 according to an embodiment of the invention.

FIG. 8 is a diagram showing the read reset value operation of the pixel unit 105 as shown in FIG. 1 according to an embodiment of the invention. As shown in FIG. 8, the control signal rstc is still kept at the lower/decreased voltage, and the level of supply voltage vay is still within the range lower than the level of VDD, e.g. a range between 0.7 Volts and 3.3 Volts. The processing circuit 110 generates and uses the control signal rst to control transistor Q4 be fully turned off, so that the potential barrier b4 is established. As shown in FIG. 8, the transistor Q5 is controlled and kept at the smaller conductance ratio state, and the height of the top of the potential barrier b5 is lower than that of the top of potential barrier b4 since the transistor Q4 is fully turned off. The reset transistor Q4 is turned off to raise up a bottom potential level of the second floating diffusion node FDc. The small and narrow potential well formed by the potential barriers b3 and b5 is deeper than the large and broad potential well formed by the potential barriers b4 and b5 wherein the bottom of the small and narrow potential well is lower than the bottom of the potential well formed by the potential barriers b4 and b5. The small and narrow potential well formed by the potential barriers b3 and b5 can be used to capture the particles (energy, charges, electrons) after being reset so as to reflect a reset pixel signal at the first floating diffusion node FD after each light exposure operation is performed. It should be noted that the particles may be not completed cleared actually even the reset operation has been performed. In addition, the captured reset pixel signal then can be transmitted from the first source follower transistor NSF1 to the output node OUT and read out and obtained by the processing circuit 110. Also, it should be noted that the reset pixel signal may be different in each light exposure operation due to different light conditions or other factors. Similarly, in one embodiment, the potential well formed by the potential barriers b4 and b5 can be used to capture the particles (energy, charges, or electrons) after being reset so as to reflect another reset pixel signal at the second floating diffusion node FDc after each light exposure operation is performed. The another captured reset pixel signal then can be transmitted from the second source follower transistor NSF2 to the output node OUT and read out and obtained by the processing circuit 110 if necessary. The processing circuit 110 can generate reset pixel value(s) according to the reset pixel signal(s) mentioned above.

Figure 9:
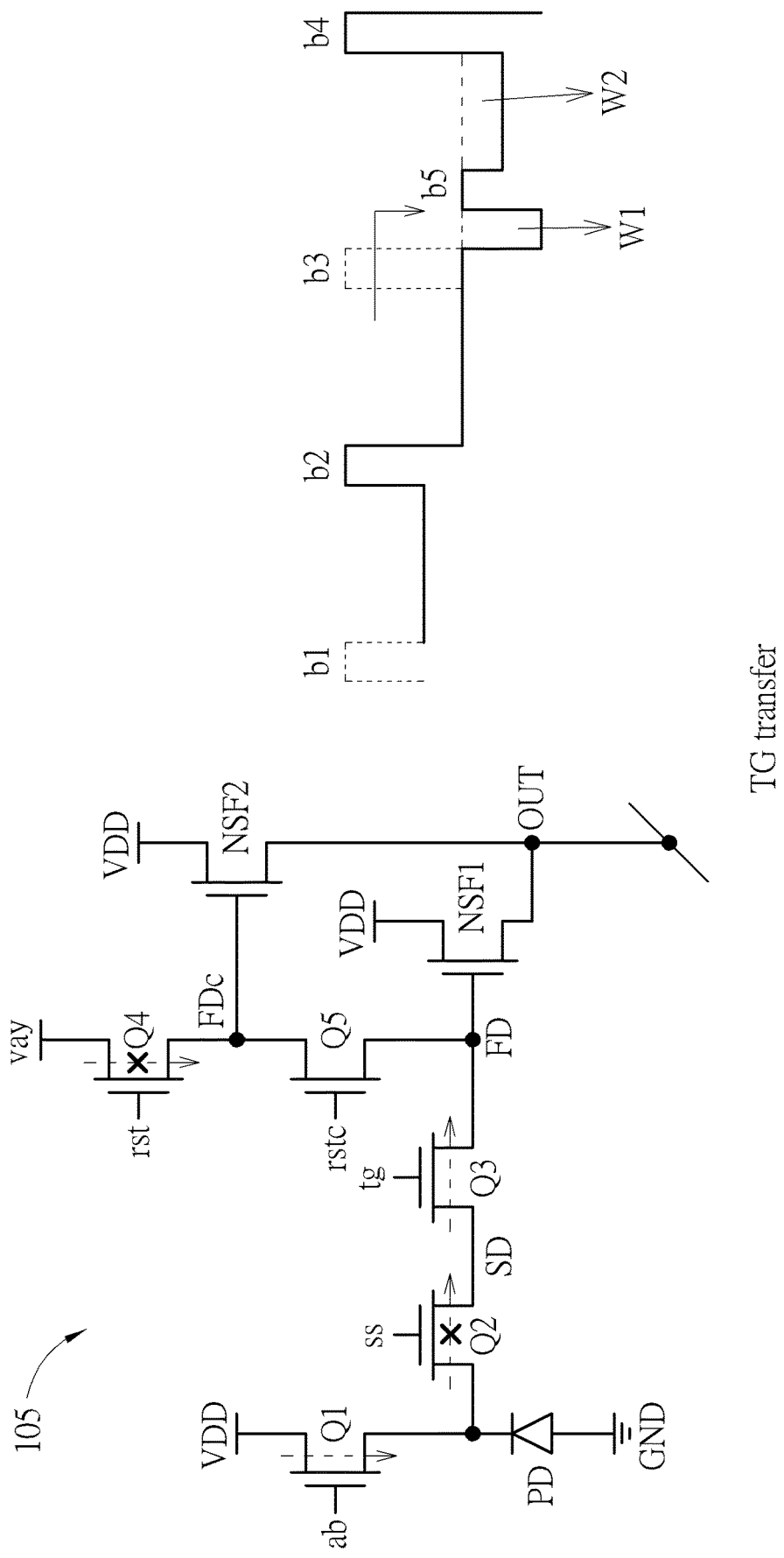
FIG. 9 is a diagram showing the TG transfer operation of the pixel unit as shown in FIG. 1 according to an embodiment of the invention.

After the read reset value operation is finished, the pixel unit 105 performs the charge transfer (or TG (transfer gate) transfer) operation and read signal operation. FIG. 9 is a diagram showing the TG transfer operation of the pixel unit 105 as shown in FIG. 1 according to an embodiment of the invention. As shown in FIG. 9, the control signal rstc is still kept at the lower/decreased voltage, and the level of supply voltage vay is still within the range lower than the level of VDD, e.g. a range between 0.7 Volts and 3.3 Volts. The transistor Q3 is fully turned on by the control signal tg generate from the processing circuit 110 and becomes conductive, and thus the potential barrier b3 disappears. The particles (energy, charges, or electrons) originally captured in the potential well formed by the barriers b2 and b3 as shown in FIG. 8 will be dumped or moved to the potential well W1 and then the potential well W2 if it is needed. For example, a large amount of particles, associated with a bright/light condition, is dumped into the potential wells W1 and W2. A small amount of particles, associated with a dark condition, may be dumped into only the potential well W1. This is not meant to be a limitation of the invention. Equivalently, in this situation, the transfer gate transistor Q3 is turned on to transfer a charge signal from the storage diffusion node SD into only the first floating diffusion node FD if the charge signal is associated with a dark (lower light) condition. A portion of the charge signal is transferred from the storage diffusion node SD into the first floating diffusion node FD and another portion of the charge signal is transferred from the storage diffusion node SD and first floating diffusion node FD into the second floating diffusion node FDc if the charge signal is associated with a bright (higher light) condition.

Figure 10:
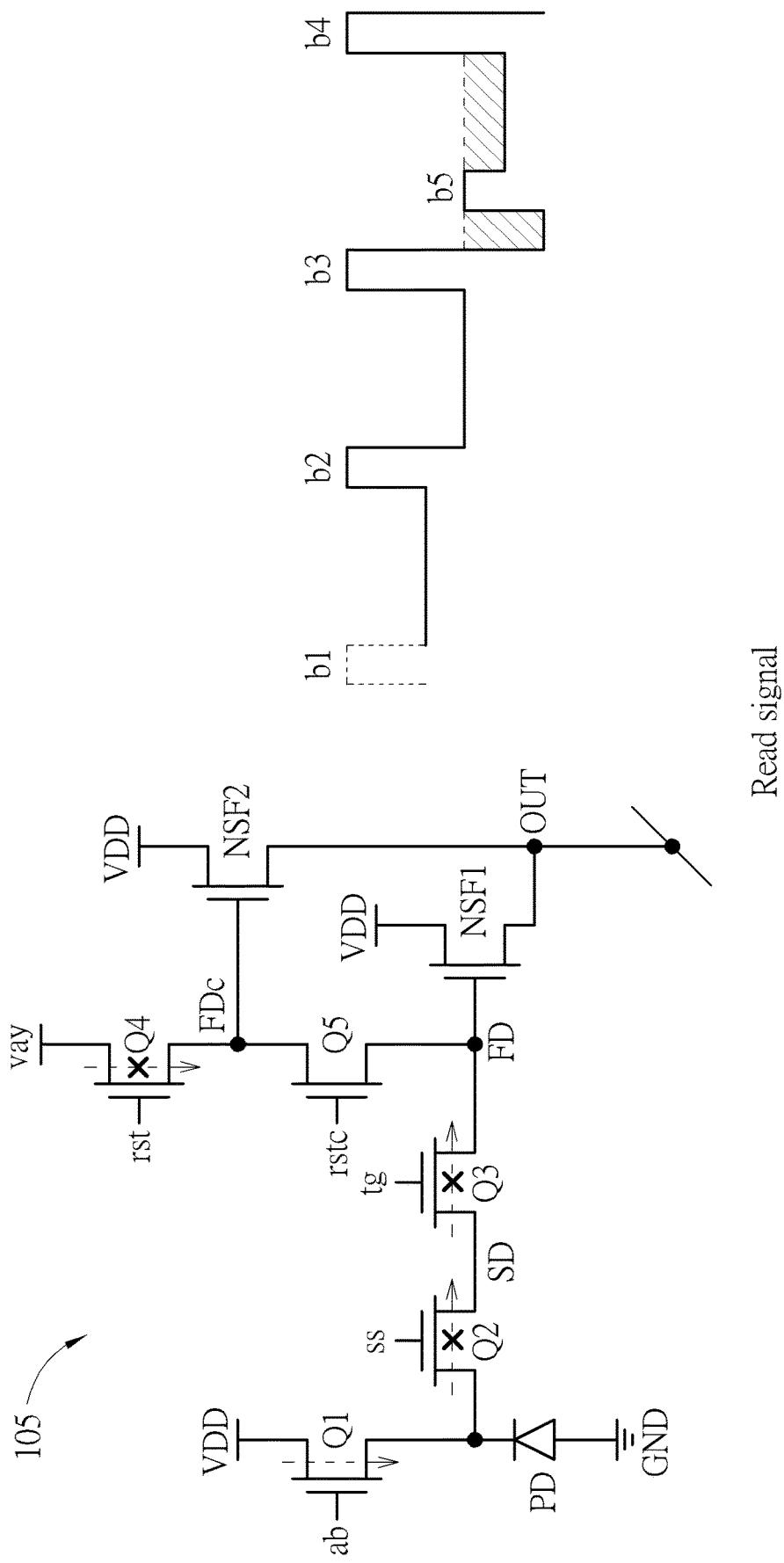
FIG. 10 is a diagram showing the read signal operation of the pixel unit as shown in FIG. 1 after performing the TG transfer operation according to an embodiment of the invention.

FIG. 10 is a diagram showing the read signal operation of the pixel unit 105 as shown in FIG. 1 after performing the TG transfer operation according to an embodiment of the invention. As shown in FIG. 10, the control signal rstc is still kept at the lower/decreased voltage, and the level of supply voltage vay is still within the range lower than the level of VDD, e.g. a range between 0.7 Volts and 3.3 Volts. The particles have been fully dumped into the potential well (s), and the transistor Q3 is fully turned off by the control signal tg so that the potential barrier b3 is established again. In this situation, a sensed/sampled pixel image signal corresponding to the dumped amount of particles accumulated in the potential well(s) can be obtained and read out by the processing circuit 110 via the output node OUT.

In practice, the value of the sensed/sampled pixel image signal, read out and generated by the processing circuit 110, is determined based on the accumulated amount of particles accumulated in the potential well(s) and is also dominated by the potential height of the accumulated amount of particles. The pixel unit 115 can employ the small and narrow well W1 to more accurately and discriminatively to reflect and generate the values of sensed/sampled pixel image signals associated with the dark condition. That is, the difference between the values of sensed/sampled pixel image signals associated with the dark condition can become larger so that the discrimination between the values of sensed/sampled pixel image signals associated with the dark condition can be sufficient or enough. Alternatively, for a light condition, the larger amount of particles may be accumulated in the potential well formed by the potential barriers b3 and b4 in FIG. 10, and the pixel unit 115 can employ such large and broad potential well to accurately reflect and generate the values of sensed/sampled pixel image signals associated with the light condition. The difference between the values of sensed/sampled pixel image signals associated with the light/bright condition can be still large enough; that is, the discrimination between the values of sensed/sampled pixel image signals associated with the light/bright condition can be still sufficient or enough.

During a time period of one or each exposure operation, the processing circuit 110 can obtain a pixel reset value/signal and a sampled pixel image value/signal, and then it can generate or estimate a resultant pixel image value which is not affected by noises. For example, a double sampling operation is employed by the image sensor device 100 to generate the pixel reset value/signal and sampled pixel image value/signal so as to obtain the resultant pixel image value. In addition, it should be noted that the image sensor device 100 based on the above-mentioned operation is able to accurately obtain the pixel reset value/signal and sampled pixel image value/signal no matter which one of light/dark conditions the image sensor device 100 operates.

Figure 11:
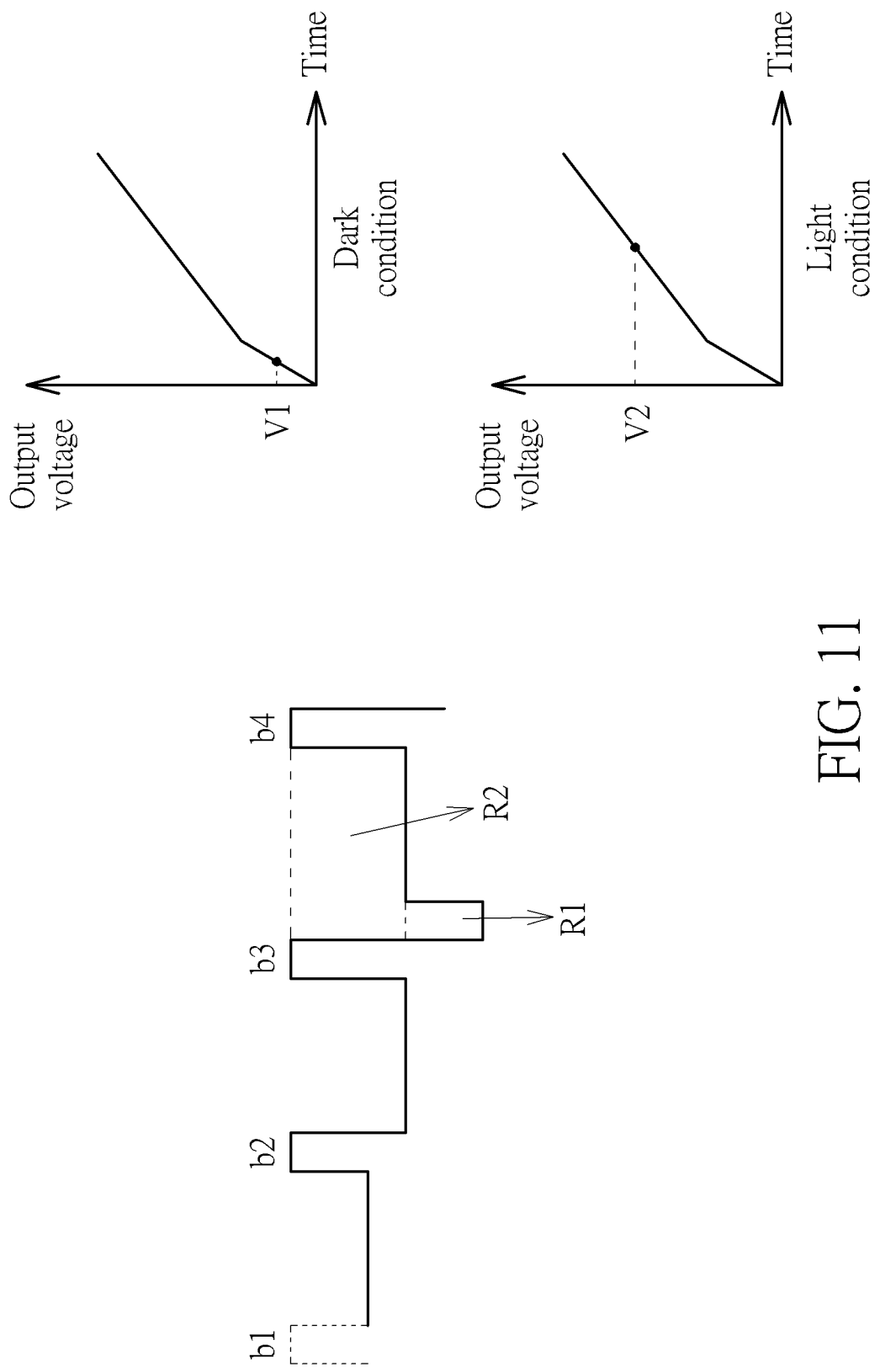
FIG. 11 shows a diagram of another example of potential wells of one or each pixel unit in FIG. 1 according to an embodiment of the invention.

Further, in one embodiment, the potential wells may be configured to be different (or have different shapes or sizes). FIG. 11 shows a diagram of another example of potential wells of one or each pixel unit 105 in FIG. 1 according to an embodiment of the invention. As shown in FIG. 11, the small and narrow potential well corresponding to the potential barrier b5 is indicated by the area or region R1. After the small and narrow potential well becomes full due to a portion of the dumped energy, charges, or particles, another portion of the dumped energy, charges, or particles can be stored or accumulated in the potential well indicated by the area or region R2. That is, the energy, charges, or particles corresponding to a dark condition may be accumulated by only the small and narrow potential well indicated by region R1. Alternatively, the energy, charges, or particles corresponding to a light/bright condition may be accumulated by the small and narrow potential well indicated by region R1 at first and then may be accumulated in the region R2. Thus, equivalently a voltage at the output node OUT is determined only according to the charge signal at the first floating diffusion node FD when the charge signal is associated with the lower light condition. The voltage at the output node OUT is determined according to a first portion of the charge signal at the first floating diffusion node FD and then is determined according to a second portion of the charge signal at the second floating diffusion node FDc when the charge signal is associated with the higher light condition. Suppose that the energy, charges, or particles corresponding to the light/bright condition may be dumped at a substantially fixed rate/speed. In this situation, since the bottom of region R1 is narrower than the bottom of region R2, the level of accumulated energy, charges, or particles in region R1 rises sooner than the level accumulated energy, charges, or particles in region R2.

The analog voltage level at the output node OUT, which can be actually read out by the processing circuit 110, is determined based on the total amount of accumulated energy, charges, or particles and is significantly dominated by the width of the bottom of the potential well(s). according to the total amount of accumulated energy, charges, or particles, the actual voltage level will be increased with time at a first slope at first, and then it will be increased with time at a second slope if needed. The first slope is sharper than the second slope due to that the bottom of the small and narrow potential well is narrower. For example, in a dark condition, V1 indicates the resultant voltage level at the output node OUT which can be actually read out, and such voltage level rises based on the first slope which is sharper. Alternatively, in a light condition, V2 indicates the resultant voltage level at the output node OUT which can be actually read out, and such voltage level rises based on the first slope at first and then rises according to the second slope which is not sharper than the first slope.

Figure 12:
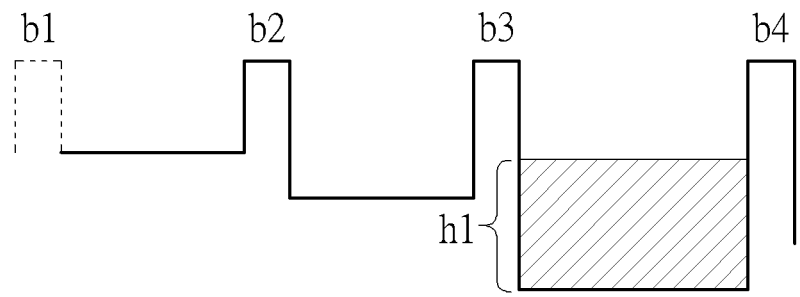
FIG. 12 is a diagram showing a comparison between resultant levels of the potential of accumulated energy, charges, or particles dumped into the different potential wells between potential barriers b3 and b5 in the same bright/light condition respectively for the prior art example and an embodiment of the invention.
Figure 12:
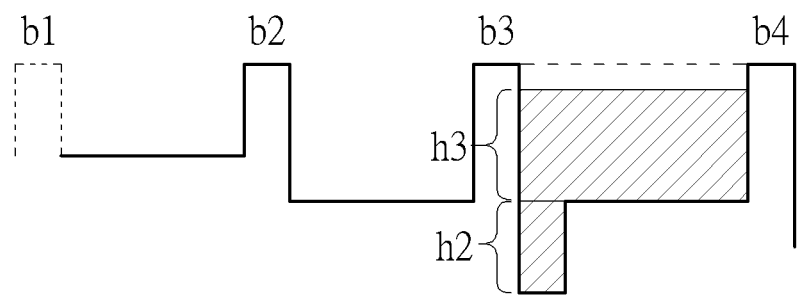

FIG. 12 is a diagram showing a comparison between resultant levels of the potential of accumulated energy, charges, or particles dumped into the different potential wells between potential barriers b3 and b5 in the same bright/light condition respectively for the prior art example and an embodiment of the invention. As shown in FIG. 12, the resultant level of the potential of the dumped and accumulated energy, charges, or particles in the prior art example is associated with the height h1. The resultant level of the potential of the same dumped and accumulated energy, charges, or particles in the embodiment of the invention is associated with the sum of heights h2 and h3 wherein the summed height (h2+h3) is slightly higher or greater than the height h1. Since in FIG. 11 the width of region R2 is identical to that of the prior art potential well and the region R1 indicating the smaller well is smaller compared to the region R2, the actual and resultant voltage level at the output node OUT in the embodiment of invention, i.e. associated with (or proportional to) the summed height (h2+h3), is merely slightly larger than the actual and resultant voltage level at the output node OUT in the prior art example, i.e. associated with (or proportional to) the height h1.

Figure 13:
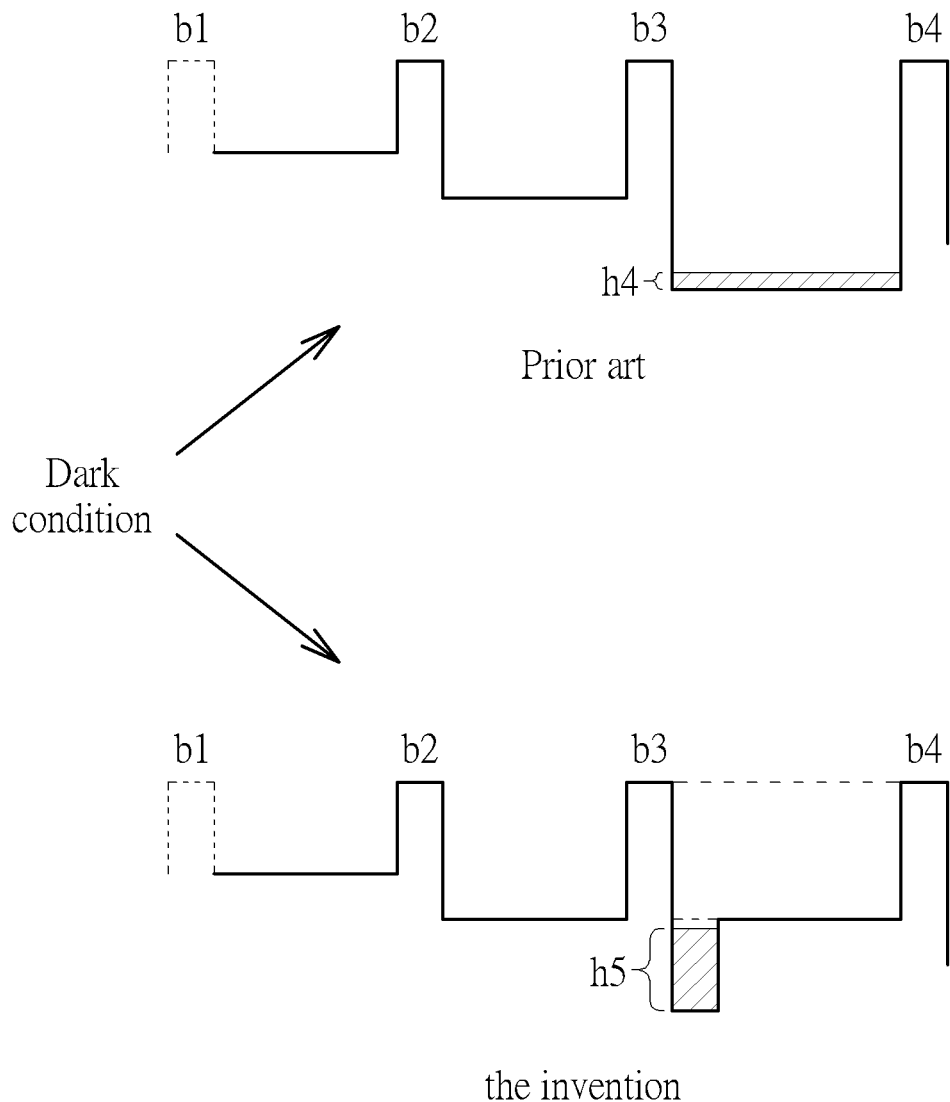
FIG. 13 is a diagram showing the comparison between resultant levels of the potential of accumulated energy, charges, or particles dumped into the different potential wells between potential barriers b3 and b5 in the same dark condition respectively for the prior art example and an embodiment of the invention.

Such comparison is significantly different in a dark condition. FIG. 13 is a diagram showing the comparison between resultant levels of the potential of accumulated energy, charges, or particles dumped into the different potential wells between potential barriers b3 and b5 in the same dark condition respectively for the prior art example and an embodiment of the invention. As shown in FIG. 13, the resultant level of the potential of the dumped and accumulated energy, charges, or particles in the prior art example is associated with the height h4. The resultant level of the potential of the same dumped and accumulated energy, charges, or particles in the embodiment of the invention is associated with the height h5 wherein the height h5 is significantly different and significantly higher or greater than the height h4 since the embodiments uses the smaller and narrower potential well while the prior art potential well is broader. The actual and resultant voltage level at the output node OUT in the embodiment of invention, i.e. associated with (or proportional to) the height h5, is significantly different and larger than the actual and resultant voltage level at the output node OUT in the prior art example, i.e. associated with (or proportional to) the height h4. Further, the smaller and narrower potential well can also generate and reflect a clear and evident voltage change in the resultant voltage level at the output node OUT in response to a slight variation of the dumped and accumulated energy, charges, or particles in the dark condition. Thus, this effectively achieves and improves the better signal discrimination of different sensed/sampled pixel values when the image sensor device 100 operates in the dark condition.

Figure 14:
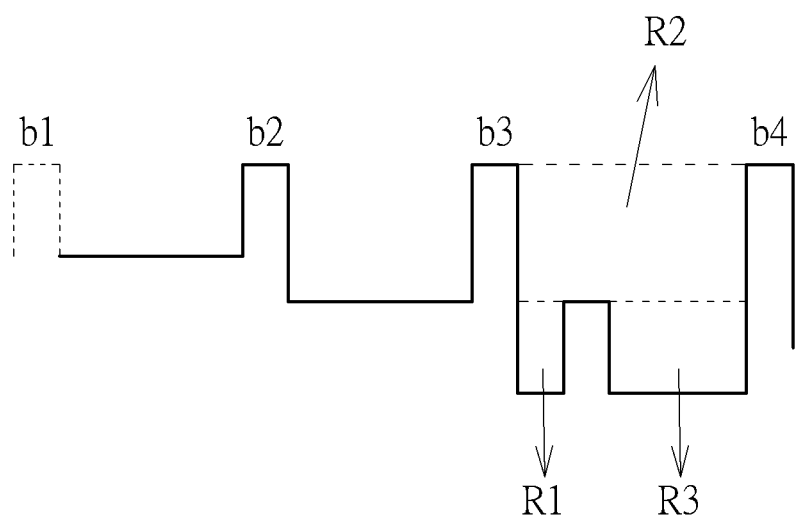
FIG. 14 is a diagram of another different example of potential wells of one or each pixel unit in FIG. 1 according to an embodiment of the invention.
Figure 15:
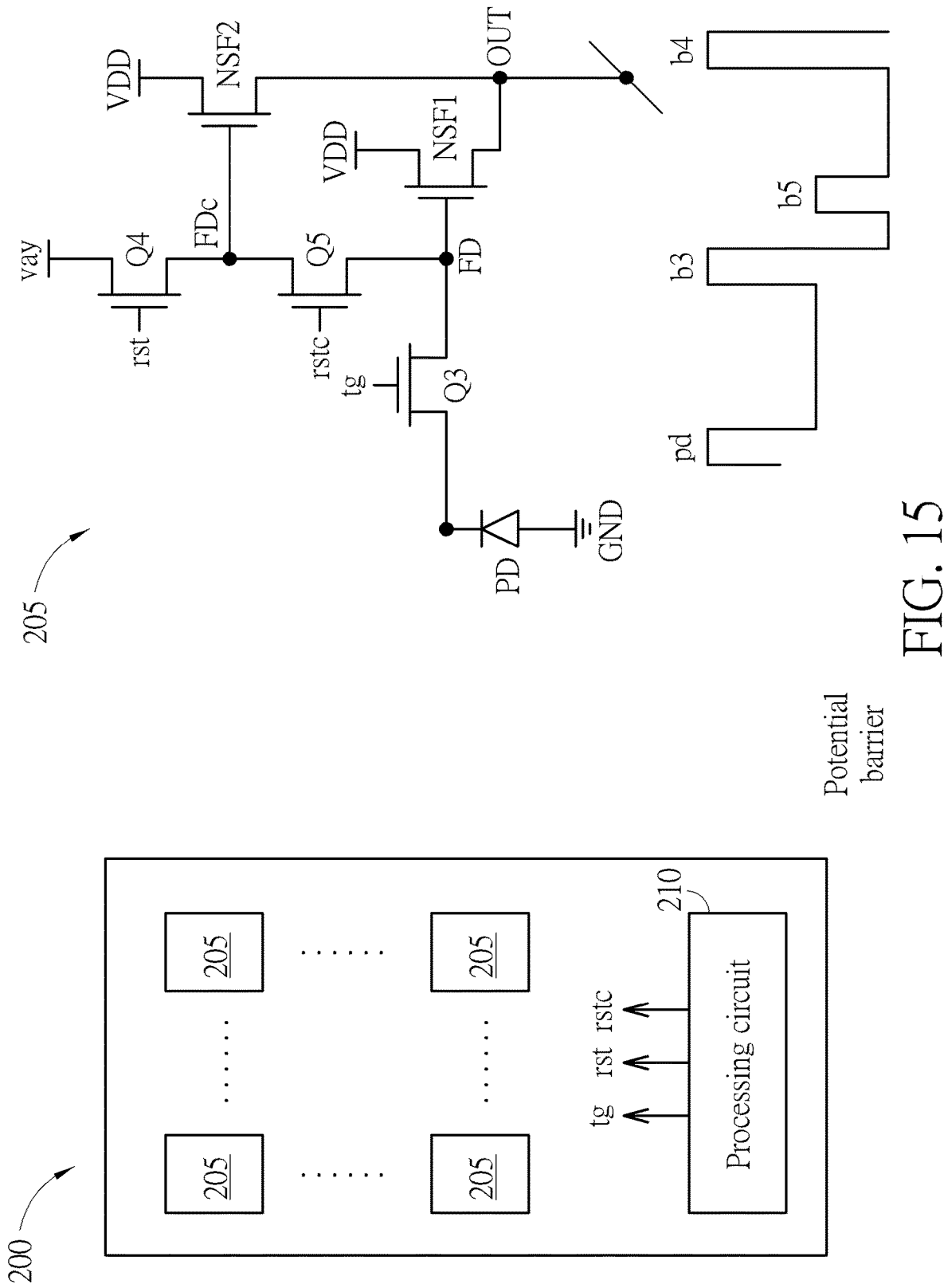
FIG. 15 is a diagram of an image sensor device operating based on a rolling shutter mode according to an embodiment of the invention.

Additionally, in other embodiments, the transistor Q5 can be configured and designed to form a different potential well when the transistor Q5 is not fully turned off. FIG. 14 is a diagram of another different example of potential wells of one or each pixel unit 105 in FIG. 1 according to an embodiment of the invention. As shown in FIG. 14, the region R1 indicates a smaller and narrower potential well formed by two corresponding potential barriers b3 and b5. The region R3 indicates a medium potential well formed by two potential barriers b5 and b4. A residual amount of energy, charges, or particles will be dumped into the medium potential well indicated by region R3 if the smaller potential well indicated by region R1 becomes full. The larger region formed by regions R1, R2, and R3 indicates a large potential well formed by two potential barriers b3 and b4. When the medium potential well indicated by region R3 becomes full, a residual amount of energy, charges, or particles will be accumulated by the large potential well indicated by region R2.

FIG. 15-FIG. 23 respectively shows the circuit diagram and corresponding operations of an image sensor device 200 operating based on a rolling shutter mode according to an embodiment of the invention. The image sensor device 200 comprises a plurality of pixel units 205, i.e. sensing pixels or sub-pixels, and a processing circuit 210. Each pixel unit 205 operating based on the rolling shutter mode comprises the photodiode PD, transfer gate transistor Q3, first source follower transistor NSF1, reset transistor Q4, reset control transistor Q5, and the second source follower transistor NSF2. That is, the anti-blooming transistor Q1 and intermediate transistor Q2 are excluded from this embodiment. The processing circuit 210 operating based on the rolling shutter mode is used for generating the transfer gate signal tg, the reset signal rst. The potential barrier pd is caused by the photodiode PD. The function and operations of elements included within the pixel unit 205 are similar to those of the elements having the same names/symbols, and can be shown in FIG. 16-FIG. 23.

Figure 16:
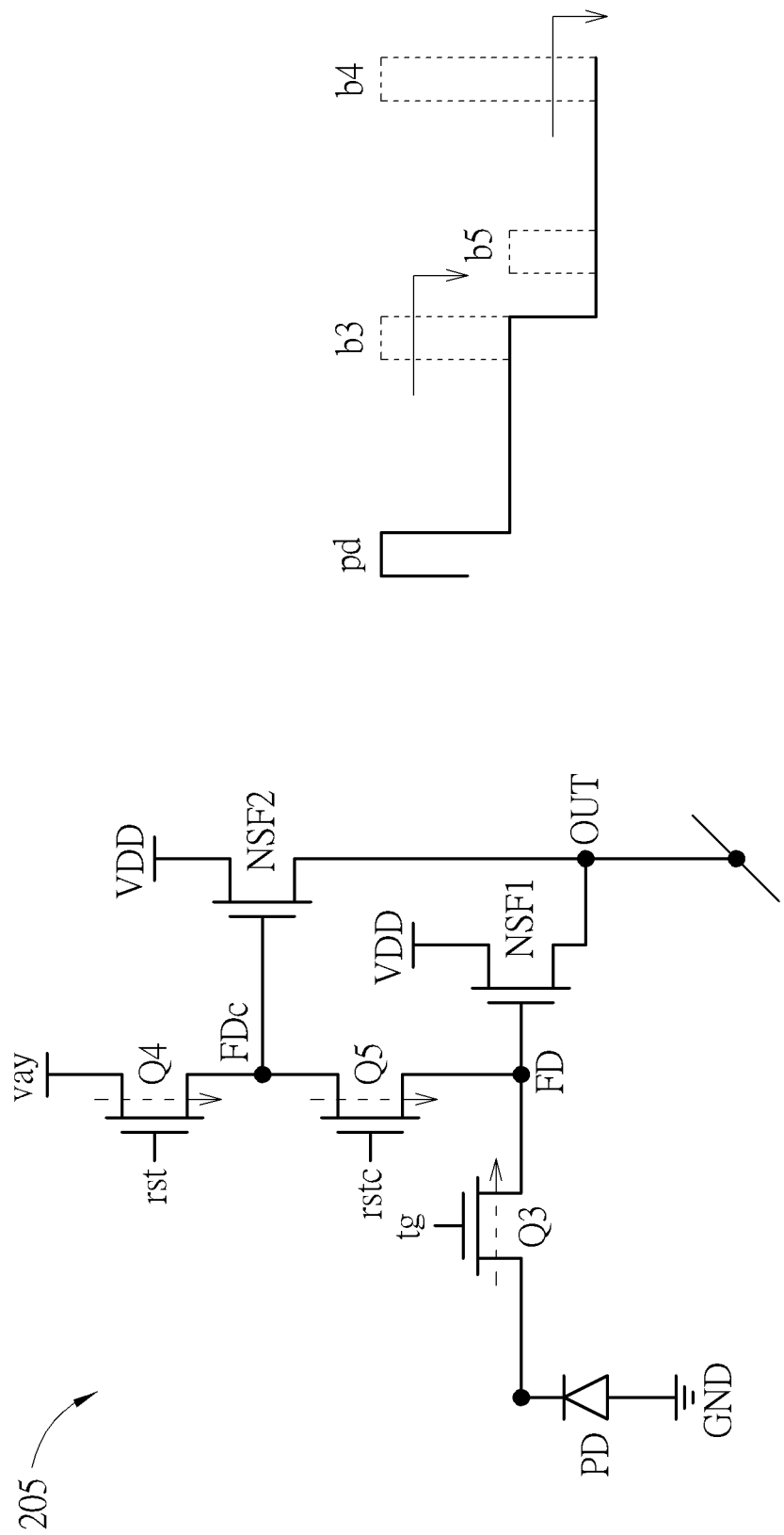
FIG. 16 is a diagram showing the reset exposure operation of the pixel unit as shown in FIG. 15 according to an embodiment of the invention.
Figure 17:
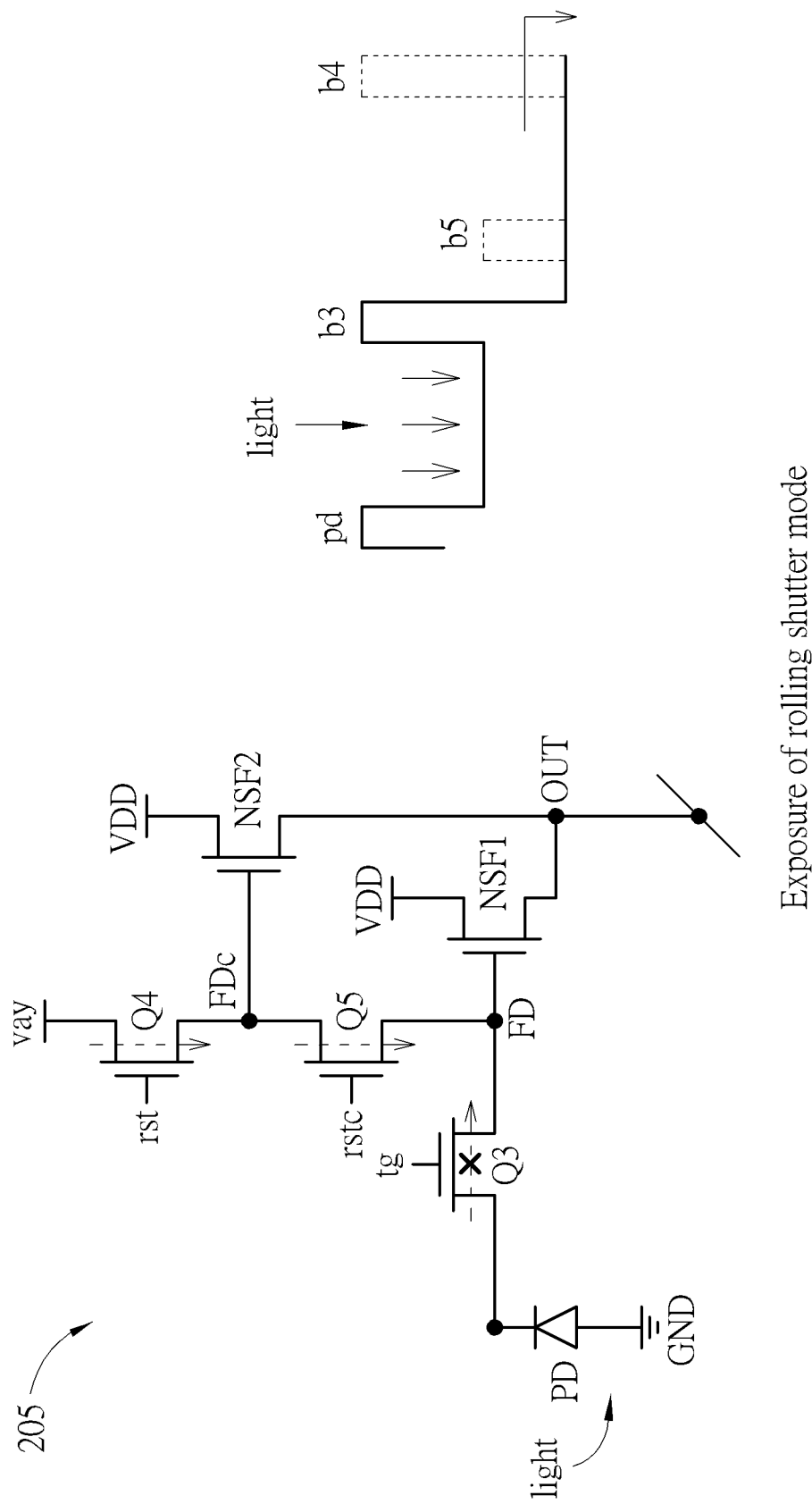
FIG. 17 is a diagram showing the exposure operation of the pixel unit as shown in FIG. 15 according to an embodiment of the invention.
Figure 18:
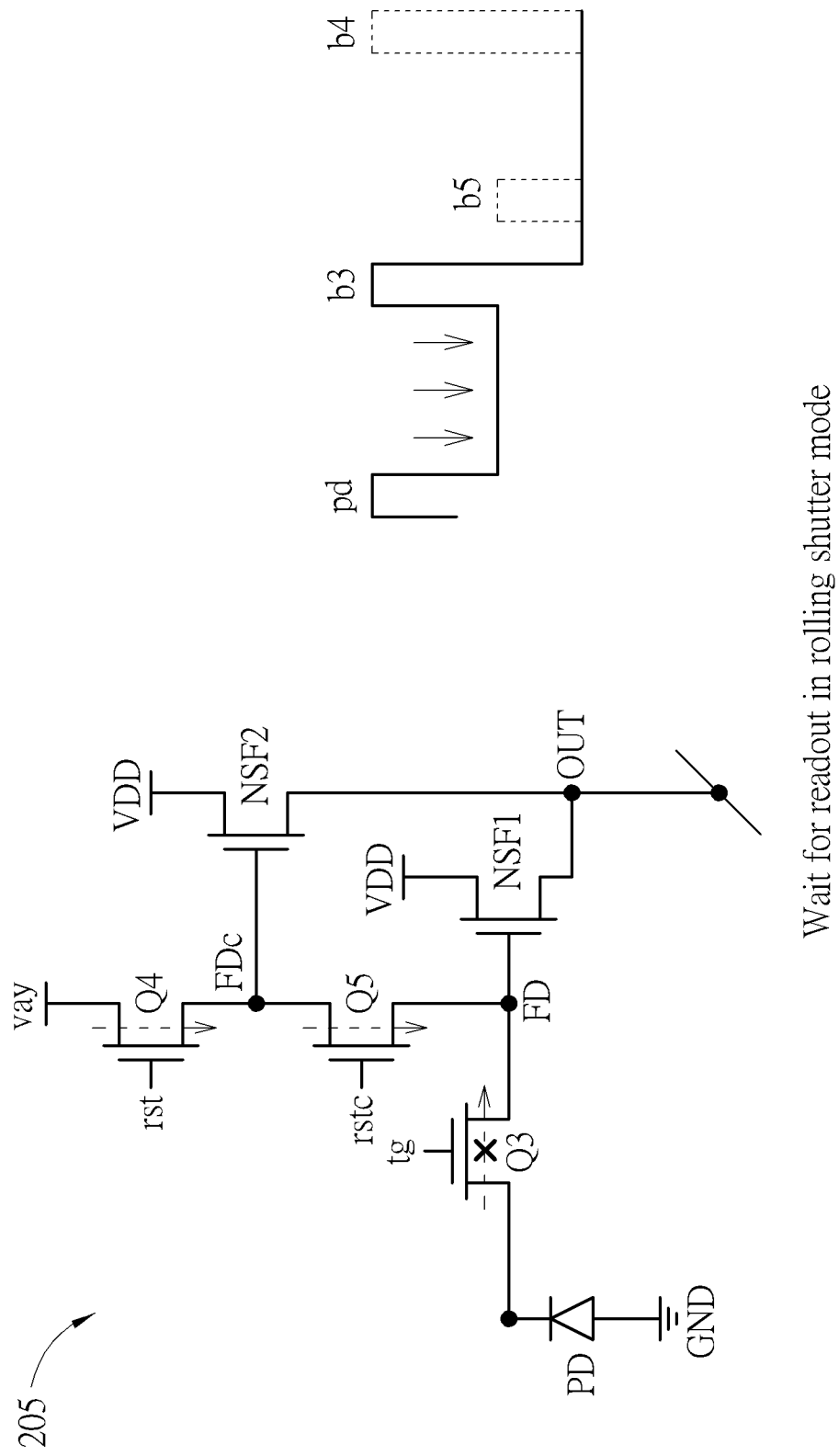
FIG. 18 is a diagram showing the wait for readout operation of the pixel unit as shown in FIG. 15 according to an embodiment of the invention.

For example, as shown in FIG. 16, when performing the reset exposure operation based on the rolling shutter mode, the transistors Q3, Q4, and Q5 are fully turned on by corresponding control signals tg, rstc, and rst, respectively, and the potential barriers b3, b4, and b5 disappear. As shown in FIG. 17, when performing the exposure operation based on the rolling shutter mode, the levels of supply voltages vay and VDD are controlled at a higher level such as 3.3 Volts (but not limited), and the transistor Q3 is fully turned off by the control signal tg, and the potential barrier b3 is established to form the potential well between the potential barriers pd and b3. During a time period of the exposure operation, the photodiode PD converts the incident light into an electrical current, and the particles (charges, energy, or electrons) converted from the incident light can be captured and accumulated by such potential well as shown in FIG. 17. As shown in FIG. 18, when the wait for readout is performed, the level of supply voltage VDD is controlled at the higher level such as 3.3 Volts, and the level of supply voltage vay is controlled at a lower level such as a level ranging between 0.5 Volts and 0.7 Volts (but not limited).

Figure 19:
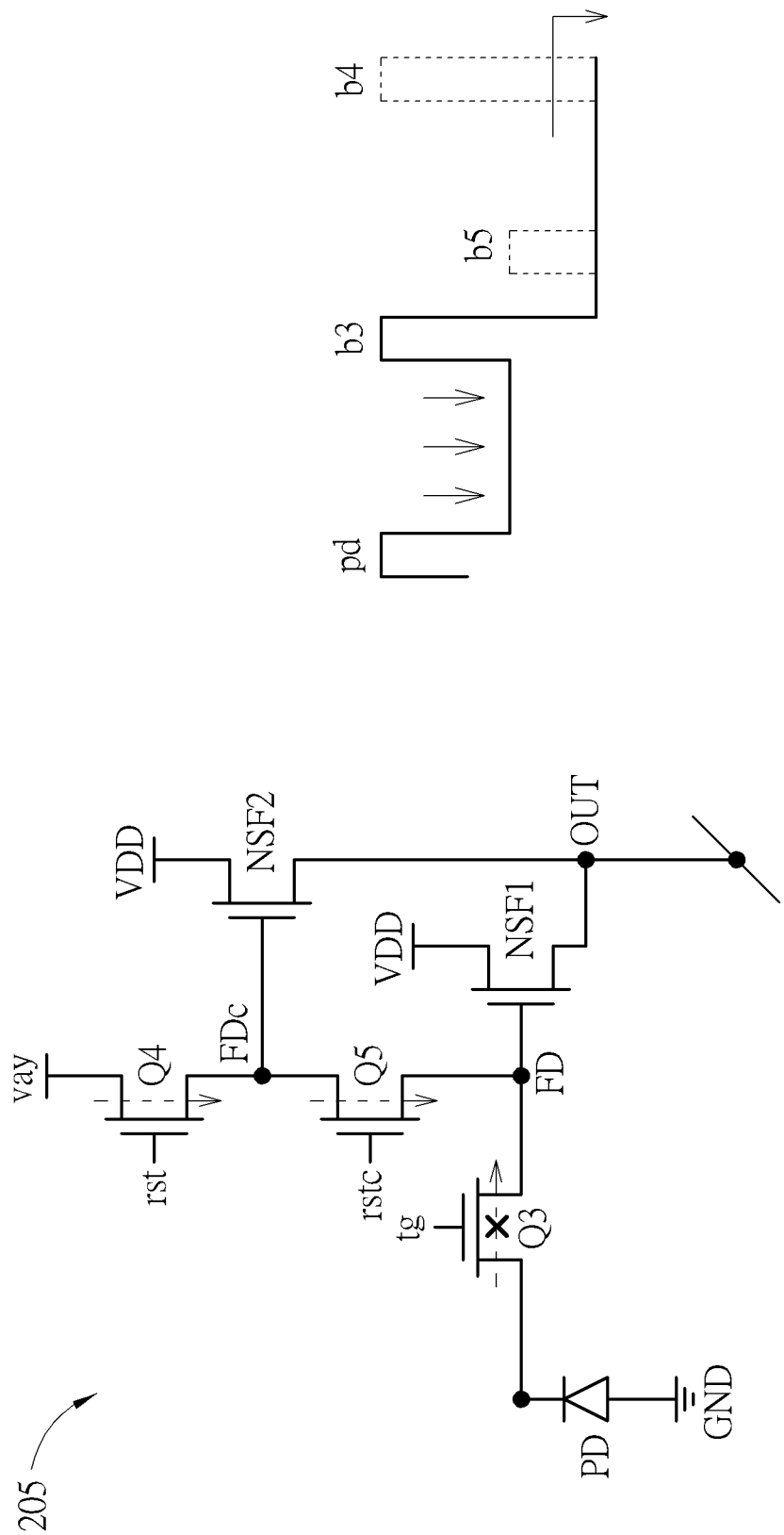
FIG. 19 is a diagram showing the reset FD operation of the pixel unit as shown in FIG. 15 according to an embodiment of the invention.

As shown in FIG. 19, the levels of supply voltages VDD and vay are controlled at the higher level such as 3.3 Volts (but not limited). The transistor Q3 is kept at the turned-off state, and the transistors Q4 and Q5 are kept at the turned-on state. The second supply voltage level vay is raised up to the high voltage level (e.g. 3.3 Volts) to turn on the first source follower transistor NSF1 and the second source follower transistor NSF2. The residual energy or charges at the first floating diffusion node FD can be cleared and reset since the potential barriers b4 and b5 are not established to form a potential well.

Figure 20:
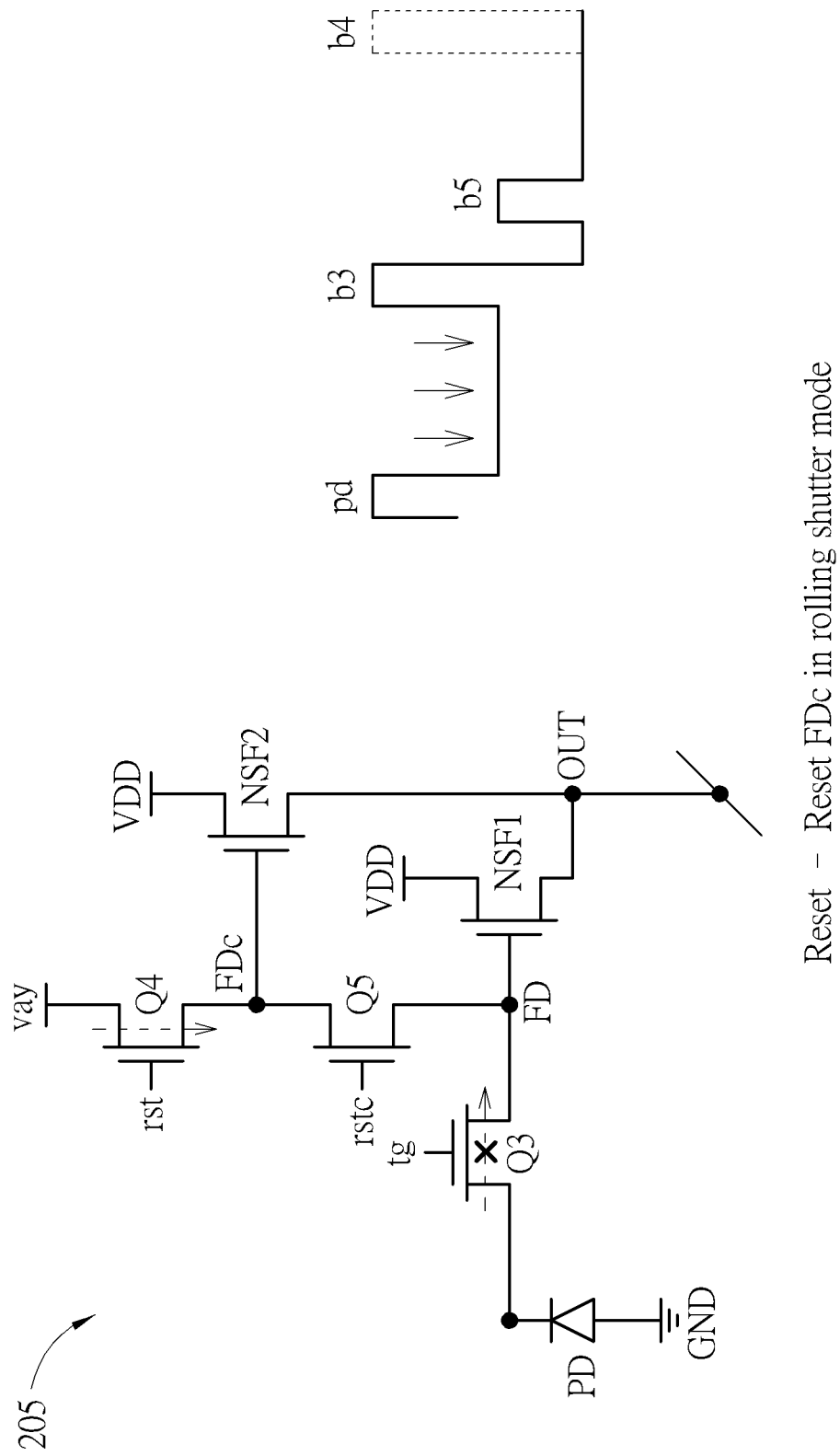
FIG. 20 is a diagram showing the reset FDc operation of the pixel unit as shown in FIG. 15 according to an embodiment of the invention.

As shown in FIG. 20, the level of supply voltage VDD is controlled at the higher level such as 3.3 Volts (but not limited). The processing circuit 110 at first generates and uses the control signal rstc with a lower voltage (i.e. decreasing the voltage of control signal rstc) and then controls the level of supply voltage vay be within a range lower than the level of VDD, e.g. a range between 0.7 Volts and 3.3 Volts, so as to control transistor Q5 be not fully turned off.

Figure 21:
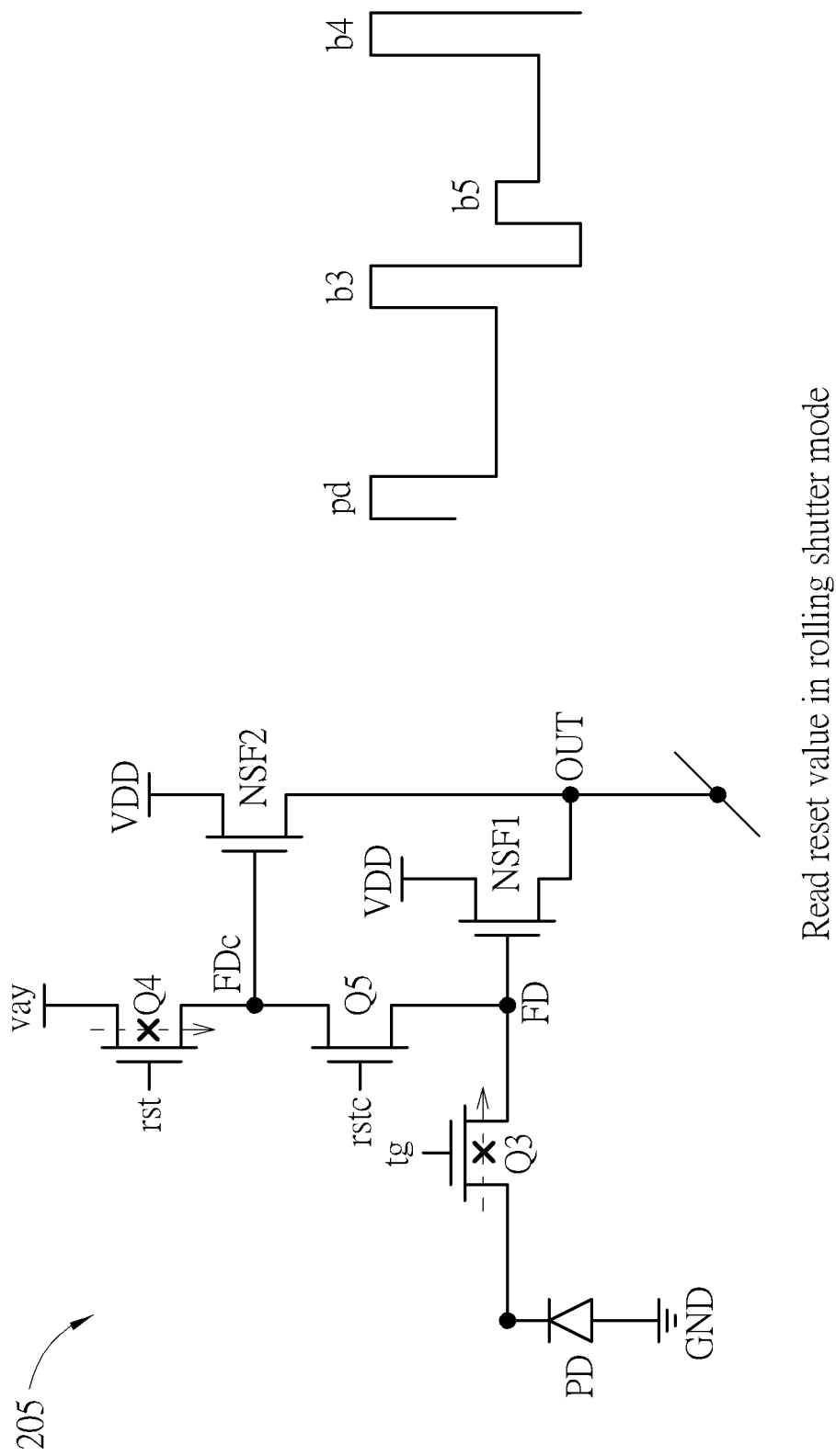
FIG. 21 is a diagram showing the read reset value operation of the pixel unit as shown in FIG. 15 according to an embodiment of the invention.

As shown in FIG. 21, the control signal rstc is still kept at the lower/decreased voltage, and the level of supply voltage vay is still within the range lower than the level of VDD, e.g. a range between 0.7 Volts and 3.3 Volts. The transistor Q4 is fully turned off, so that the potential barrier b4 is established. The transistor Q5 is controlled and kept at the smaller conductance ratio state, and the height of the top of the potential barrier b5 is lower than that of the top of potential barrier b4 since the transistor Q4 is fully turned off.

Figure 22:
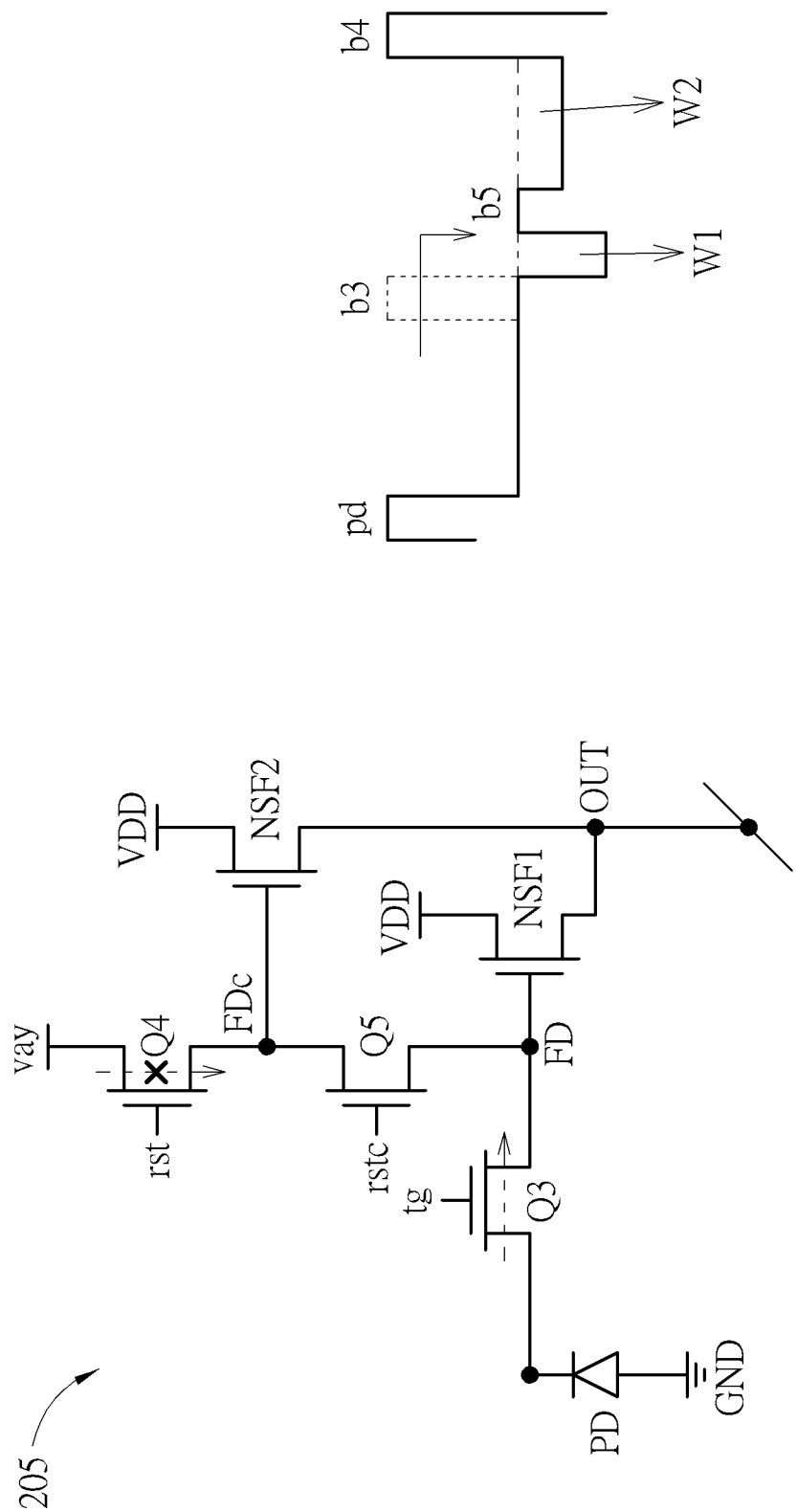
FIG. 22 is a diagram showing the TG transfer operation of the pixel unit as shown in FIG. 15 according to an embodiment of the invention.

As shown in FIG. 22, the control signal rstc is still kept at the lower/decreased voltage, and the level of supply voltage vay is still within the range lower than the level of VDD, e.g. a range between 0.7 Volts and 3.3 Volts. The transistor Q3 is fully turned on by the control signal tg generate from the processing circuit 110 and becomes conductive, and thus the potential barrier b3 disappears.

Figure 23:
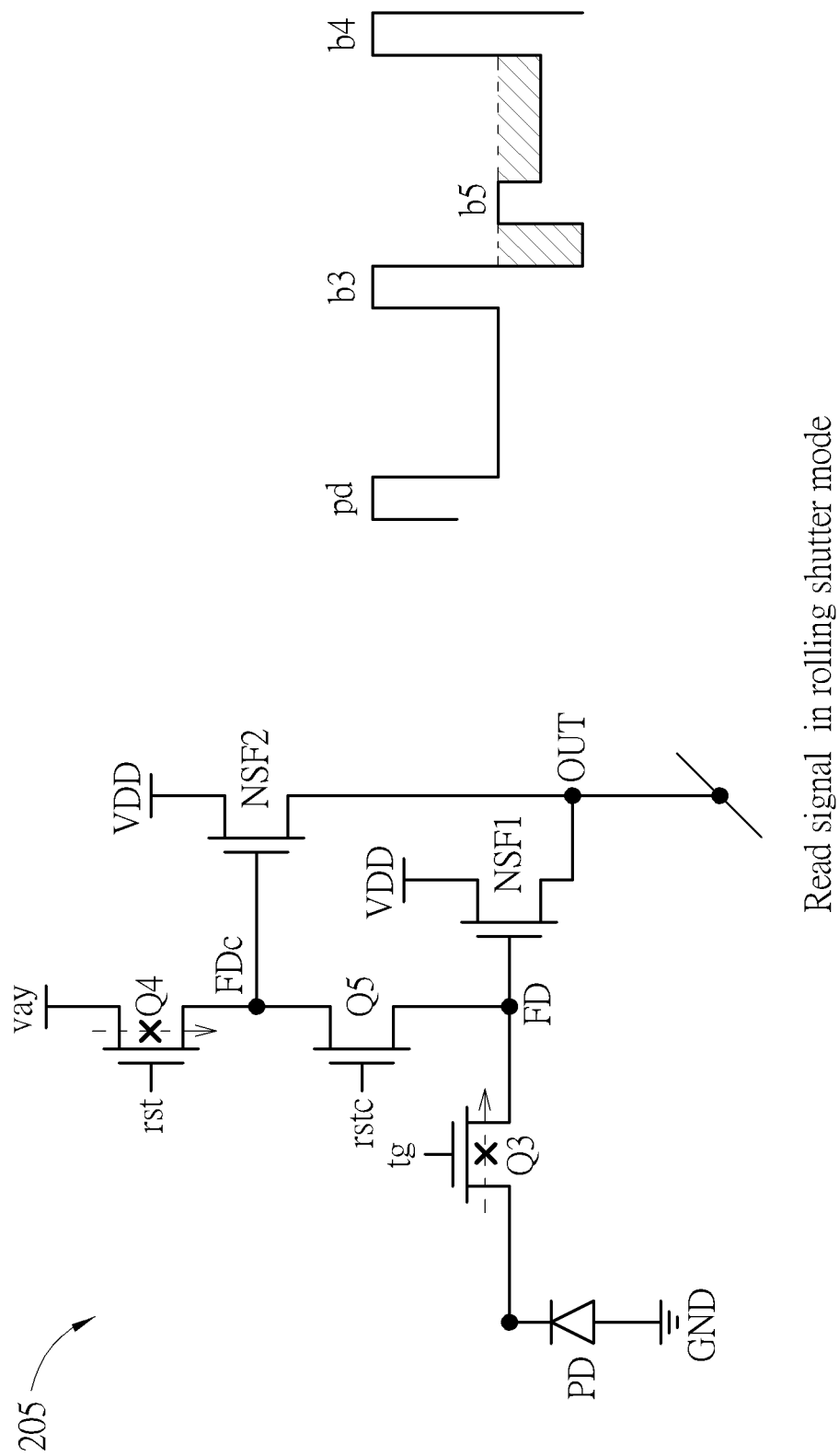
FIG. 23 is a diagram showing the read signal operation of the pixel unit as shown in FIG. 15 after performing the TG transfer operation according to an embodiment of the invention.

As shown in FIG. 23, the control signal rstc is still kept at the lower/decreased voltage, and the level of supply voltage vay is still within the range lower than the level of VDD, e.g. a range between 0.7 Volts and 3.3 Volts. The particles have been fully dumped into the potential well(s), and the transistor Q3 is fully turned off by the control signal tg so that the potential barrier b3 is established again. In this situation, a sensed/sampled pixel image signal corresponding to the dumped amount of particles accumulated in the potential well(s) can be obtained and read out by the processing circuit 110 via the output node OUT.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor device, comprising:
a plurality of pixel units, each pixel unit comprising:
a photodiode, having a first end coupled to a ground level and a second end;
a transfer gate transistor, having a first terminal coupled to the photodiode, a second terminal coupled to a first floating diffusion node, and a control terminal coupled to a transfer gate signal;
a first source follower transistor, having a first terminal coupled to the first supply voltage level, a second terminal coupled to an output node, and a control terminal coupled to the first floating diffusion node;
a reset transistor, having a first terminal coupled to a second supply voltage level, a second terminal coupled to a second floating diffusion node, and a control terminal coupled to a reset signal;
a reset control transistor, having a first terminal coupled to the second floating diffusion node, a second terminal coupled to the first floating diffusion node, and a control terminal coupled to a reset control signal; and
a second source follower transistor, having a first terminal coupled to the first supply voltage level, a second terminal coupled to the output node, and a control terminal coupled to the second floating diffusion node;
wherein a potential barrier caused by the reset control transistor, which is controlled by the reset control signal, is lower than a potential barrier caused by the transfer gate transistor when being turned off.

2. The image sensor device of claim 1, wherein the second supply voltage level is an adjustable supply voltage level which is equal to or lower than the first supply voltage level that is a high supply voltage level.

3. The image sensor device of claim 1, further comprising:
a processing circuit, coupled to the plurality of pixel units, for generating the transfer gate signal, the reset signal, and the reset control signal.

4. The image sensor device of claim 1, wherein the reset control transistor is controlled by the reset control signal having a voltage level which is lower than a high voltage level and higher than a low voltage level, so that a potential barrier generated by the reset control transistor is lower than a potential barrier generated by the reset transistor when the reset transistor is turned off.

5. The image sensor device of claim 1, wherein when the image sensor device performs a reset exposure operation, the transfer gate transistor, the reset transistor, and the reset control transistor are turned on, to make potential barriers caused by the transfer gate transistor, the reset transistor, and the reset control transistor disappear.

6. The image sensor device of claim 1, wherein when the image sensor device performs an exposure operation based on a rolling shutter mode, the transfer gate transistor is turned off, and the reset transistor and the reset control transistor are turned on, to generate a potential barrier of the transfer gate transistor to form a potential well to receive light energy from the photodiode.

7. The image sensor device of claim 6, wherein when the image sensor device waits for pixel data readout after the exposure operation, the second supply voltage level is adjusted down to a low voltage level to turnoff the first source follower transistor and the second source follower transistor.

8. The image sensor device of claim 7, wherein when the image sensor device is arranged to reset the first floating diffusion node after waiting for the pixel data readout, the second supply voltage level is raised up to the high voltage level to turn on the first source follower transistor and the second source follower transistor.

9. The image sensor device of claim 8, wherein when the image sensor device is arranged to reset the second floating diffusion node after the first source follower transistor and the second source follower transistor are turned on, a voltage level of the reset control signal is decreased to control the reset control transistor be partially conductive, and the second supply voltage level is decreased down to an intermediate voltage level between the high voltage level and the low voltage level, so as to make the potential barrier generated by the reset control transistor is lower than a potential barrier generated by the transfer gate transistor.

10. The image sensor device of claim 9, wherein when the image sensor device performs a reset value read operation after the second floating diffusion node is reset, the reset transistor is turned off to raise up a bottom potential level of the second floating diffusion node.

11. The image sensor device of claim 10, wherein when the image sensor device performs a charge transfer operation, the transfer gate transistor is turned on to transfer a charge signal from the photodiode into the first floating diffusion node if the charge signal is associated with a lower light condition; and, a portion of the charge signal is transferred from the photodiode into the first floating diffusion node and then another portion of the charge signal is transferred from the first floating diffusion node into the second floating diffusion node if the charge signal is associated with a higher light condition.

12. The image sensor device of claim 1, wherein when the image sensor device performs a charge transfer operation, a charge signal is transferred from the storage diffusion node into the first floating diffusion node if the charge signal is associated with a lower light condition; and, a first portion of the charge signal is transferred from the storage diffusion node into the first floating diffusion node and then a second portion of the charge signal is transferred from the first floating diffusion node into the second floating diffusion node if the charge signal is associated with a higher light condition.

13. The image sensor device of claim 12, wherein a voltage at the output node is determined only according to the charge signal at the first floating diffusion node when the charge signal is associated with the lower light condition.

14. The image sensor device of claim 12, wherein a voltage at the output node is determined according to the first portion of the charge signal at the first floating diffusion node and then is determined according to the second portion of the charge signal at the second floating diffusion node when the charge signal is associated with the higher light condition.

15. The image sensor device of claim 14, wherein the voltage at the output node increases with a first positive slope and then increases with a second positive slope which is smaller than the first positive slope.

16. The image sensor device of claim 1, wherein the each pixel units further comprises:
  an anti-blooming transistor, having a first terminal coupled to a first supply voltage level, a second terminal coupled to the photodiode, and a control terminal coupled to an anti-blooming signal generated by the processing circuit; and
  an intermediate transistor, coupled between the photodiode and the transfer gate transistor, controlled by an intermediate control signal generated by the processing circuit.

17. The image sensor device of claim 16, wherein when the image sensor device performs a reset exposure operation, the anti-blooming transistor, the transfer gate transistor, the reset transistor, and the reset control transistor are turned on, and the intermediate transistor is turned off, to make potential barriers caused by the anti-blooming transistor, the transfer gate transistor, the transfer gate transistor reset transistor, and the reset control transistor disappear.

18. The image sensor device of claim 17, wherein when the image sensor device performs an exposure operation, the anti-blooming transistor and the intermediate transistor are turned off, and the transfer gate transistor, the reset transistor, and the reset control transistor are turned on, to generate a potential barrier of the anti-blooming transistor and a potential barrier of the intermediate transistor.

19. The image sensor device of claim 18, wherein when the image sensor device performs a global dump operation, the second supply voltage level is at a high voltage level, and the anti-blooming transistor, the transfer gate transistor are turned off; the intermediate transistor, the reset transistor, and the reset control transistor are turned on.

20. The image sensor device of claim 7, wherein when the image sensor device waits for pixel data readout after the global dump operation, the anti-blooming transistor is turned on, the intermediate transistor is turned off, and the second supply voltage level is adjusted down to a low voltage level to turn off the first source follower transistor and the second source follower transistor.

* * * * *